(12) United States Patent
Yaguchi

(10) Patent No.: US 9,684,849 B2
(45) Date of Patent: Jun. 20, 2017

(54) IMAGE PROCESSING DEVICE, INFORMATION STORAGE DEVICE, AND IMAGE PROCESSING METHOD

(71) Applicant: OLYMPUS CORPORATION, Shibuya-ku, Tokyo (JP)

(72) Inventor: Yoichi Yaguchi, Hino (JP)

(73) Assignee: OLYMPUS CORPORATION, Tokyo (JE)

( * ) Notice: Subject to any disclaimer, the term of this patent is extended or adjusted under 35 U.S.C. 154(b) by 188 days.

(21) Appl. No.: 14/669,497

(22) Filed: Mar. 26, 2015

(65) Prior Publication Data

US 2015/0199590 A1 Jul. 16, 2015

Related U.S. Application Data

(63) Continuation of application No. PCT/JP2013/075080, filed on Sep. 18, 2013.

(30) Foreign Application Priority Data

Sep. 27, 2012 (JP) ................................ 2012-214532
Apr. 26, 2013 (JP) ................................ 2013-093347

(51) Int. Cl.
*G06K 9/62* (2006.01)
*G06K 9/46* (2006.01)
(Continued)

(52) U.S. Cl.
CPC ......... *G06K 9/6215* (2013.01); *G06K 9/4604* (2013.01); *G06K 9/6203* (2013.01);
(Continued)

(58) Field of Classification Search
None
See application file for complete search history.

(56) References Cited

U.S. PATENT DOCUMENTS 5,473,369 A * 12/1995 Abe .......................... G06T 7/20
348/169
5,767,922 A * 6/1998 Zabih ..................... H04N 5/147
348/699
(Continued)

FOREIGN PATENT DOCUMENTS

CN 102096917 A 6/2011
EP 2823754 A1 1/2015
(Continued)

OTHER PUBLICATIONS

Yilmaz, Alper, Omar Javed, and Mubarak Shah. "Object tracking: A survey."Acm computing surveys (CSUR) 38.4 (2006): 13.*
(Continued)

*Primary Examiner* — Kim Vu
*Assistant Examiner* — Nathan Bloom
(74) *Attorney, Agent, or Firm* — Holtz, Holtz & Volek PC

(57) ABSTRACT

An image processing device includes: an image sequence acquisition section that acquires an image sequence that includes a plurality of constituent images; and a processing section that performs an image summarization process that deletes some of the plurality of constituent images included in the image sequence to generate a summary image sequence, the processing section detecting an observation target area from each of the plurality of constituent images, selecting a reference image and a determination target image from the plurality of constituent images, calculating deformation information about a deformation estimation target area included in the reference image and the deformation estimation target area included in the determination target image, and determining whether or not the determination target image can be deleted based on the observation target area included in the reference image, the observation target (Continued)

area included in the determination target image, and the deformation information.

15 Claims, 22 Drawing Sheets

(51) Int. Cl.
    *G06T 5/50*     (2006.01)
    *G06T 7/00*     (2017.01)

(52) U.S. Cl.
    CPC .............. *G06T 5/50* (2013.01); *G06T 7/0014* (2013.01); *G06K 2209/05* (2013.01); *G06T 2207/10016* (2013.01); *G06T 2207/10068* (2013.01); *G06T 2207/20224* (2013.01); *G06T 2207/30028* (2013.01)

(56) References Cited

U.S. PATENT DOCUMENTS

| | | | | |
|---|---|---|---|---|
| 6,389,168 | B2 * | 5/2002 | Altunbasak | G06F 17/3079 348/700 |
| 6,724,915 | B1 * | 4/2004 | Toklu | G06T 7/204 382/103 |
| 2005/0046699 | A1 * | 3/2005 | Oya | G08B 13/19602 348/207.1 |
| 2006/0189843 | A1 | 8/2006 | Nakamura et al. | |
| 2006/0257048 | A1 * | 11/2006 | Lin | G06K 9/00711 382/276 |
| 2006/0291696 | A1 * | 12/2006 | Shao | G06K 9/3216 382/103 |
| 2007/0060798 | A1 | 3/2007 | Krupnik et al. | |
| 2007/0171279 | A1 * | 7/2007 | Hasegawa | A61B 1/00009 348/65 |
| 2007/0195165 | A1 | 8/2007 | Hirakawa | |
| 2008/0068454 | A1 | 3/2008 | Hirakawa | |
| 2008/0212881 | A1 | 9/2008 | Hirakawa | |
| 2009/0051695 | A1 | 2/2009 | Matsuda | |
| 2009/0148014 | A1 | 6/2009 | Kanda | |
| 2009/0309961 | A1 | 12/2009 | Miyashita | |
| 2010/0067808 | A1 | 3/2010 | Matsuzaki | |
| 2010/0097392 | A1 * | 4/2010 | Nishiyama | A61B 1/00009 345/593 |
| 2010/0119110 | A1 | 5/2010 | Kanda | |
| 2010/0124365 | A1 | 5/2010 | Kanda | |
| 2010/0183204 | A1 * | 7/2010 | Kanda | G06T 7/204 382/128 |
| 2010/0194992 | A1 | 8/2010 | Kouno | |
| 2011/0311133 | A1 | 12/2011 | Hirota et al. | |
| 2012/0008860 | A1 | 1/2012 | Hirota et al. | |
| 2012/0020524 | A1 * | 1/2012 | Ishikawa | H04N 7/183 382/103 |
| 2014/0126789 | A1 | 5/2014 | Ban et al. | |
| 2014/0376792 | A1 | 12/2014 | Matsuzaki et al. | |
| 2014/0376817 | A1 | 12/2014 | Yaguchi | |
| 2015/0030254 | A1 | 1/2015 | Yaguchi | |
| 2015/0199800 | A1 | 7/2015 | Yaguchi | |

FOREIGN PATENT DOCUMENTS

| | | |
|---|---|---|
| EP | 2839770 A1 | 2/2015 |
| JP | 2005124965 A | 5/2005 |
| JP | 2006296569 A | 11/2006 |
| JP | 2006320650 A | 11/2006 |
| JP | 2007313119 A | 12/2007 |
| JP | 2009005020 A | 1/2009 |
| JP | 2009050321 A | 3/2009 |
| JP | 2009508567 A | 3/2009 |
| JP | 2009297365 A | 12/2009 |
| JP | 2010094185 A | 4/2010 |
| JP | 2010113616 A | 5/2010 |
| JP | 2010115413 A | 5/2010 |
| JP | 2010158308 A | 7/2010 |
| JP | 2010183290 A | 8/2010 |
| JP | 2011024763 A | 2/2011 |
| JP | 2011175599 A | 9/2011 |
| JP | 2011234931 A | 11/2011 |
| JP | 2012016454 A | 1/2012 |
| WO | 2007032002 A2 | 3/2007 |
| WO | 2013133368 A1 | 9/2013 |
| WO | 2013133370 A1 | 9/2013 |
| WO | 2013157354 A1 | 10/2013 |

OTHER PUBLICATIONS

Changick Kim and Jenq-Neng Hwang, "Object-based video abstraction for video surveillance systems," in IEEE Transactions on Circuits and Systems for Video Technology, vol. 12, No. 12, pp. 1128-1138, Dec. 2002.*
International Search Report (ISR) dated Dec. 24, 2013 issued in International Application No. PCT/JP2013/075080.
U.S. Appl. No. 14/669,447, filed Mar. 26, 2015, First Named Inventor: Yoichi Yaguchi, Title: "Image Processing Device, Information Storage Device, and Image Processing Method".
Chinese Office Action dated May 27, 2016 (and English translation thereof), issued in counterpart Chinese Application No. 201380050262.2.
Extended European Search Report dated Jun. 3, 2016, issued in counterpart European Application No. 13840399.3.
Chen, et al., "Trimming the Wireless Capsule Endoscopic Video by Removing Redundant Frames", 8th International Conference on Wireless Communications, Networking and Mobile Computing (WICOM 2012), Sep. 21, 2012, pp. 1-4.
Lee, et al., "Motion Analysis for Duplicate Frame Removal in Wireless Capsule Endoscope", Medical Imaging 2011: Image Processing, vol. 7962, No. 1, Mar. 3, 2011, pp. 1-8.
Extended European Search Report dated Aug. 19, 2016, issued in European Application No. 13840346.4.
Li, et al., "An Overview of Video Abstraction Techniques", Jul. 31, 2001, pp. 1-23; Retrieved from the Internet: http://www.hpl.hp.com/techreports/2001/HPL-2001-191.pdf, [retrieved on Jul. 19, 2016].
Truong, et al., "Video Abstraction: Systematic Review and Classification", ACM Transactions on Multimedia Computing Communications and Applications; vol. 3, No. 1, Article 3, Feb. 2007, pp. 1-37.

* cited by examiner

REFERENCE IMAGE

DETERMINATION
TARGET IMAGE

LESION COVERAGE = SIZE (AREA) OF LESION COMMON AREA
/ SIZE (AREA) OF LESION AREA INCLUDED IN DETERMINATION TARGET IMAGE

LESION LOSS AREA OCCUPANCY = SIZE (AREA) OF LESION AREA INCLUDED
IN DETERMINATION TARGET IMAGE − SIZE (AREA) OF LESION COMMON AREA
/ SIZE (AREA) OF DETERMINATION TARGET IMAGE

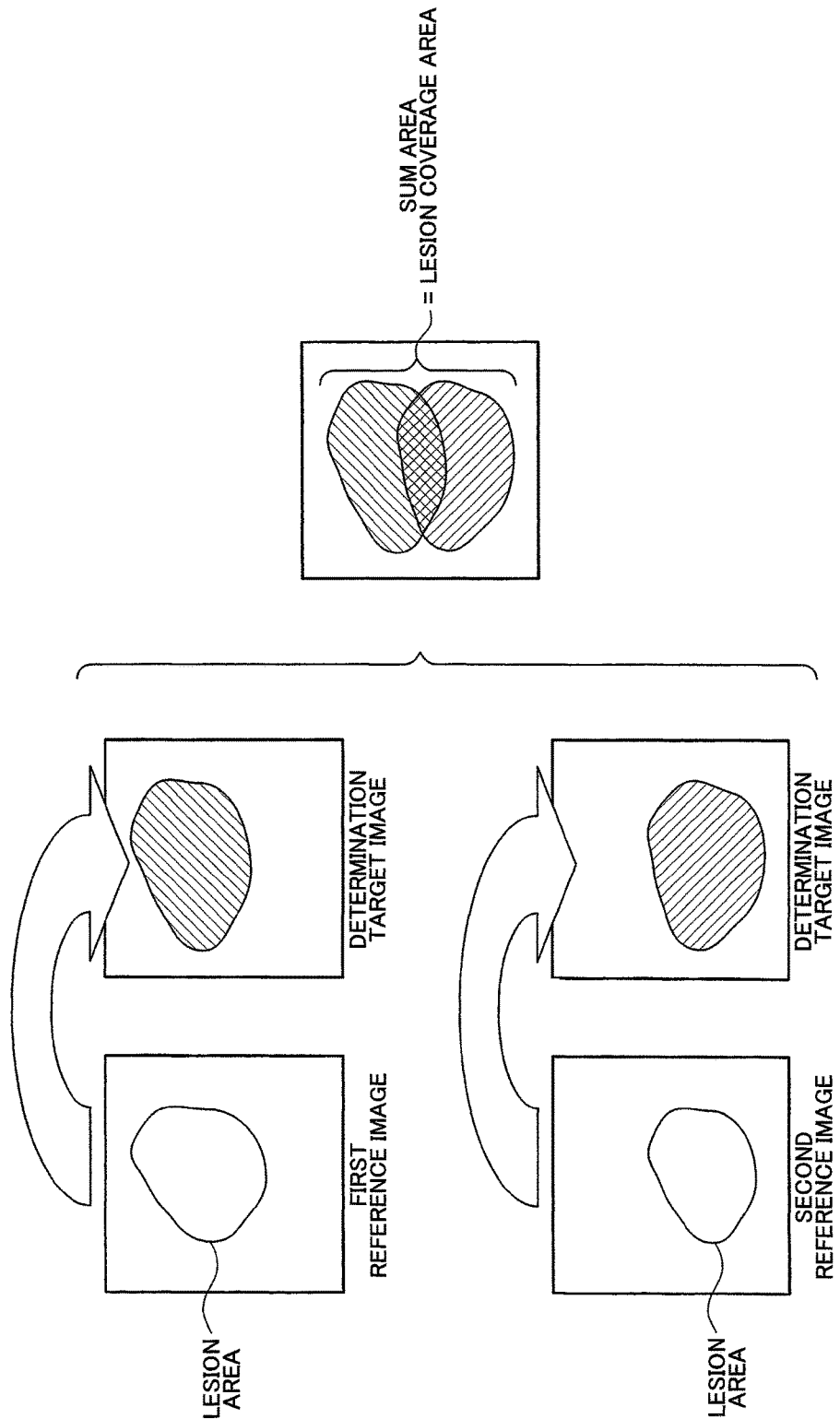

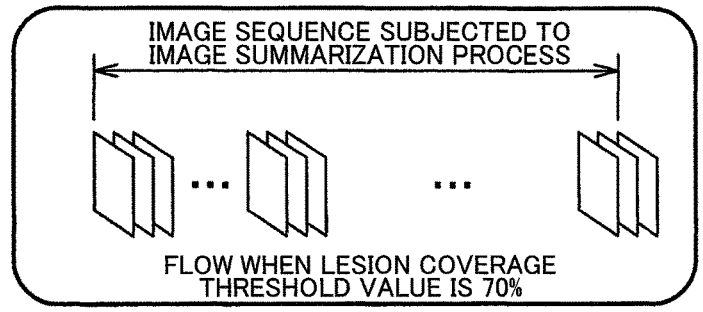
FIG. 10A
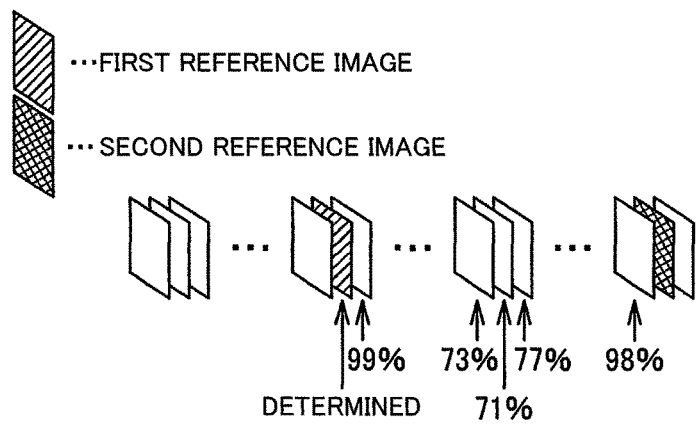
FIG. 10B
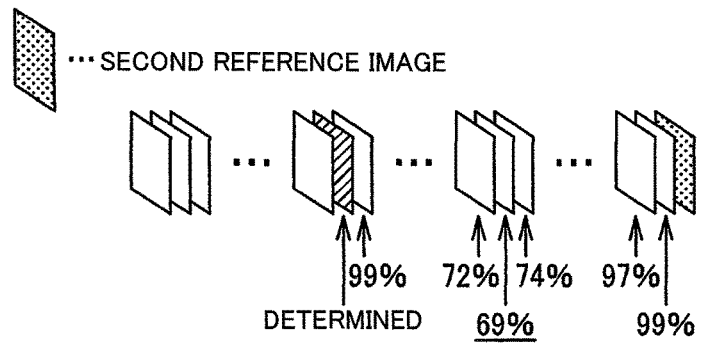

OBSERVATION TARGET LOSS AREA (A∩B)

OBSERVATION TARGET
LOSS AREA (Ā ∩ B)

OBSERVATION TARGET
LOSS AREA (Ā ∩ B)

ically or spatially continuous images (hereinafter may be referred to as "image sequence") are acquired. In such a case, it is likely that the images that are closely situated in the image sequence (i.e., images that are close to each other temporally or spatially) are similar images, and it is not likely that it is necessary to check all of a large number of images in order to determine the captured information. Since the number of images may typically be tens of thousands or more, it takes time for the user to check all of the images.

IMAGE PROCESSING DEVICE, INFORMATION STORAGE DEVICE, AND IMAGE PROCESSING METHOD

CROSS REFERENCE TO RELATED APPLICATION

This application is a continuation of International Patent Application No. PCT/JP2013/075080, having an international filing date of Sep. 18, 2013, which designated the United States, the entirety of which is incorporated herein by reference. Japanese Patent Application No. 2012-214532 filed on Sep. 27, 2012 and Japanese Patent Application No. 2013-093347 filed on Apr. 26, 2013 are also incorporated herein by reference in its entirety.

BACKGROUND

The present invention relates to an image processing device, an information storage device, an image processing method, and the like.

When still images are continuously captured in time series at given time intervals, or when a spatial object is covered by a number of images, or when a movie is captured, and each image included in the movie is used as a still image, for example, a very large number of temporally or spatially continuous images (hereinafter may be referred to as "image sequence") are acquired. In such a case, it is likely that the images that are closely situated in the image sequence (i.e., images that are close to each other temporally or spatially) are similar images, and it is not likely that it is necessary to check all of a large number of images in order to determine the captured information. Since the number of images may typically be tens of thousands or more, it takes time for the user to check all of the images.

Therefore, it has been desired to summarize the original image sequence using an image sequence that includes a smaller number of images by deleting some of the images from the original image sequence. This process is hereinafter referred to as "image summarization process". For example, JP-A-2009-5020 discloses an image summarization method that extracts a scene change boundary image included in the image sequence, or an image that represents the image sequence, and allows images from which the information represented by the image sequence can be easily determined to remain.

For example, when capturing an in vivo image using an endoscope apparatus, it is considered that the degree of importance of a lesion area included in the in vivo image is higher than that of other areas when performing diagnosis or the like. JP-A-2010-113616 discloses a method that detects a lesion area from an image.

When performing the image summarization process on in vivo images, the image summarization process may be performed so that an image from which a lesion area has been detected using the method disclosed in JP-A-2010-113616 is allowed to remain in the summary image sequence, and an image from which a lesion area has not been detected is deleted, since a high degree of importance and a high degree of attention are paid to a lesion area, for example. However, a lesion area may be detected from most of the images included in the acquired image sequence depending on the disease, and it may be inefficient (i.e., the effect of reducing the number of images may be low) to perform the image summarization process based only on whether or not a lesion area has been detected.

Therefore, the image summarization process may be performed on images that include a lesion area using the method disclosed in JP-A-2009-5020. In this case, when applying the image summarization technique to the medical field (e.g., endoscopic observation), for example, it is necessary to prevent a situation in which a lesion area that cannot be observed occurs due to deletion of an image in order to prevent a situation in which the disease is missed.

It may be necessary to prevent a situation in which it becomes impossible to observe an area other than a lesion area due to deletion of an image. For example, JP-A-2007-313119 discloses a method that detects a bubble area included in an in vivo image, and JP-A-2010-115413 discloses a method that detects a residue area. Since a mucous membrane is covered by bubbles or a residue in a bubble area and a residue area, these areas are not suitable for observation. Specifically, an area that is included in an in vivo image, and is not included in a bubble area and a residue area, has high observation value as compared with a bubble area and a residue area, and it is necessary to prevent a situation in which it becomes impossible to observe such an area due to deletion of an image.

JP-A-2012-16454 discloses a method that detects a dark area that is captured very darkly within an image, and JP-A-2011-234931 discloses a method that detects a halation area that is captured very brightly within an image. Since a dark area and a halation area have extreme pixel values (i.e., the visibility of the object is poor), these areas are not suitable for observation. Specifically, an area that is included in an image, and is not included in a dark area and a halation area, has high observation value as compared with a dark area and a halation area, and it is necessary to prevent a situation in which it becomes impossible to observe such an area due to deletion of an image.

Specifically, when an area (e.g., a lesion area, an area in which the mucous membrane is not covered, and an area in which the visibility of the object is good) included in an image that has high observation value as compared with other areas is defined as an observation target area, it is necessary to perform an image summarization process that suppresses a situation in which it becomes impossible to observe the observation target area due to deletion of an image.

SUMMARY

According to one aspect of the invention, there is provided an image processing device comprising:

an image sequence acquisition section that acquires an image sequence that includes a plurality of constituent images; and a processing section that performs an image summarization process that deletes some of the plurality of constituent images included in the image sequence acquired by the image sequence acquisition section to generate a summary image sequence, the processing section detecting an observation target area from each constituent image among the plurality of constituent images, selecting a reference image and a determination target image from the plurality of constituent images, calculating deformation information about a deformation estimation target area included in the reference image and the deformation estimation target area included in the determination target image, and determining whether or not the determination target image can be deleted based on the observation target area included in the reference image, the observation target area included in the determination target image, and the deformation information.

According to another aspect of the invention, there is provided an information storage device storing a program causes a computer to function as:

an image sequence acquisition section that acquires an image sequence that includes a plurality of constituent images; and a processing section that performs an image summarization process that deletes some of the plurality of constituent images included in the image sequence acquired by the image sequence acquisition section to generate a summary image sequence, the processing section detecting an observation target area from each constituent image among the plurality of constituent images, selecting a reference image and a determination target image from the plurality of constituent images, calculating deformation information about a deformation estimation target area included in the reference image and the deformation estimation target area included in the determination target image, and determining whether or not the determination target image can be deleted based on the observation target area included in the reference image, the observation target area included in the determination target image, and the deformation information.

According to another aspect of the invention, there is an image processing method comprising:

acquiring an image sequence that includes a plurality of constituent images;

detecting an observation target area from each constituent image among the plurality of constituent images;

selecting a reference image and a determination target image from the plurality of constituent images;

calculating deformation information about a deformation estimation target area included in the reference image and the deformation estimation target area included in the determination target image;

determining whether or not the determination target image can be deleted based on the observation target area included in the reference image, the observation target area included in the determination target image, and the deformation information; and performing an image summarization process that deletes some of the plurality of constituent images included in the image sequence based on a determination result as to whether or not the determination target image can be deleted to generate a summary image sequence.

BRIEF DESCRIPTION OF DRAWINGS

FIG. 9 is a view illustrating a process that calculates a lesion coverage area based on a plurality of reference images.

FIGS. 10A and 10B are views illustrating a deletion determination process using a first reference image and a second reference image.

FIG. 19 is a view illustrating a process that calculates an observation target area included in a reference image and an observation target coverage area based on a bubble area or the like.

FIG. 20 is a view illustrating a process that calculates an observation target area included in a determination target image based on a bubble area or the like.

DESCRIPTION OF EXEMPLARY EMBODIMENTS

Figure 1A:
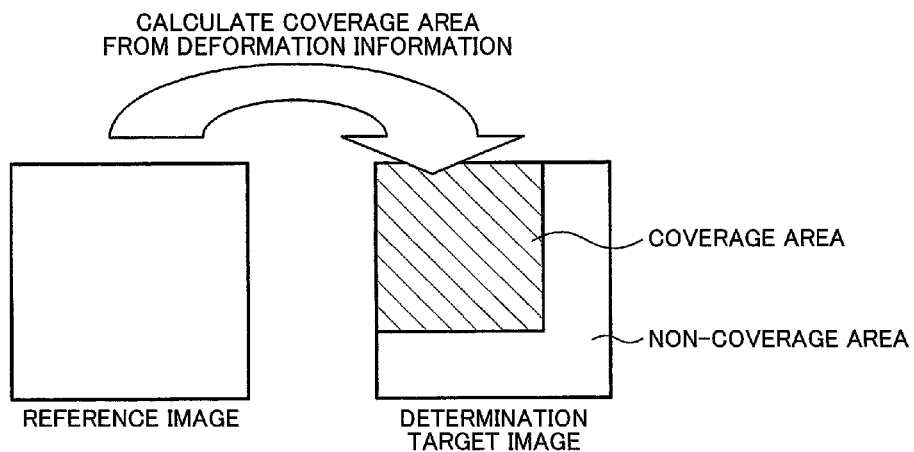
FIGS. 1A to 1C are views illustrating the reasons that a lesion area is used for an image summarization process.

According to one embodiment of the invention, there is provided an image processing device comprising:

an image sequence acquisition section that acquires an image sequence that includes a plurality of constituent images; and a processing section that performs an image summarization process that deletes some of the plurality of constituent images included in the image sequence acquired by the image sequence acquisition section to generate a summary image sequence, the processing section detecting an observation target area from each constituent image among the plurality of constituent images, selecting a reference image and a determination target image from the plurality of constituent images, calculating deformation information about a deformation estimation target area included in the reference image and the deformation estimation target area included in the determination target image, and determining whether or not the determination target image can be deleted based on the observation target area included in the reference image, the observation target area included in the determination target image, and the deformation information.

According to one embodiment of the invention, the observation target area is detected from each image, and whether or not the determination target image can be deleted is determined based on the observation target area included in the reference image, the observation target area included in the determination target image, and the deformation information about the reference image and the determination target image. This makes it possible to determine whether or not the determination target image can be deleted corresponding to the degree by which the observation target area cannot be observed, and implement an appropriate image summarization process as compared with the case of performing the image summarization process using the deformation information without taking account of the observation target area, for example.

In the image processing device,
the processing section may calculate an observation target coverage area by performing a deformation process using the deformation information on the observation target area included in the reference image, the observation target coverage area being an area that is included in the determination target image, and is covered by the observation target area included in the reference image, and may determine whether or not the determination target image can be deleted based on the calculated observation target coverage area, and the observation target area included in the determination target image.

This makes it possible to determine whether or not the determination target image can be deleted based on the observation target coverage area that corresponds to an area of the determination target image that is covered by the observation target area included in the reference image, for example.

In the image processing device,
the processing section may calculate an observation target common area that is a common area of the observation target coverage area and the observation target area included in the determination target image, may calculate an observation target coverage that is a ratio of the calculated observation target common area with respect to the observation target area included in the determination target image, and may determine whether or not the determination target image can be deleted based on the calculated observation target coverage.

This makes it possible to determine whether or not the determination target image can be deleted based on the observation target coverage.

In the image processing device,
the processing section may determine that the determination target image can be deleted when the observation target coverage is equal to or larger than a given threshold value, and may determine that the determination target image cannot be deleted when the observation target coverage is smaller than the given threshold value.

This makes it possible to determine whether or not the determination target image can be deleted using the threshold value determination process that utilizes the observation target coverage.

In the image processing device,
the processing section may calculate an observation target loss area occupancy that is a ratio of an observation target loss area with respect to the determination target image, the observation target loss area being an area that is included in the observation target area included in the determination target image, but is not included in the observation target coverage area, and may determine whether or not the determination target image can be deleted based on the calculated observation target loss area occupancy.

This makes it possible to determine whether or not the determination target image can be deleted based on the observation target loss area occupancy.

In the image processing device,
the processing section may determine that the determination target image can be deleted when the observation target loss area occupancy is smaller than a given threshold value, and may determine that the determination target image cannot be deleted when the observation target loss area occupancy is equal to or larger than the given threshold value.

This makes it possible to determine whether or not the determination target image can be deleted using the threshold value determination process that utilizes the observation target loss area occupancy.

In the image processing device,
the processing section may determine probability that an attention area included in the determination target image is missed using an observation target loss area that is an area that is included in the observation target area included in the determination target image, but is not included in the observation target coverage area, and may determine whether or not the determination target image can be deleted based on the probability that the attention area is missed.

This makes it possible to determine whether or not the determination target image can be deleted from the viewpoint of the probability that the attention area is missed, for example.

In the image processing device,
the processing section may determine the probability that the attention area included in the determination target image is missed by determining whether or not an area having a size corresponding to the attention area is included within the observation target loss area.

This makes it possible to determine the probability that the attention area is missed based on whether or not an area having a size corresponding to the attention area is included within the observation target loss area, for example.

In the image processing device,
the processing section may perform a erosion process that utilizes a structural element that corresponds to the attention area on the observation target loss area, may determine that the determination target image cannot be deleted when it has been determined by the erosion process that a residual area is present, and the attention area may be missed, and may determine that the determination target image can be deleted when it has been determined by the erosion process that the residual area is not present, and the attention area is not missed.

This makes it possible to determine the probability that the attention area is missed using the erosion process that utilizes the structural element, for example.

In the image processing device,
the processing section may calculate an observation target common area that is a common area of the observation target coverage area and the observation target area included in the determination target image, may calculate an observation target coverage that is a ratio of the calculated observation target common area with respect to the observation target area included in the determination target image, may calculate an observation target loss area occupancy that is a ratio of an observation target loss area with respect to the determination target image, the observation target loss area being an area that is included in the observation target area included in the determination target image, but is not included in the observation target common area, and may determine whether or not the determination target image can be deleted based on the calculated observation target coverage and the calculated observation target loss area occupancy.

This makes it possible to use the observation target coverage and the observation target loss area occupancy in combination, and improve the determination accuracy when determining whether or not the determination target image can be deleted, for example.

In the image processing device,
the processing section may determine that the determination target image can be deleted when it has been determined that the determination target image can be deleted by at least one of a determination based on the observation target coverage and a determination based on the observation target loss area occupancy.

This makes it possible to increase the probability that it is determined that the determination target image can be deleted, and improve the effect of reducing the number of images, for example.

In the image processing device,
the processing section may detect an area of the image other than a cover area as the observation target area.

This makes it possible to detect an area other than the cover area as the observation target area.

In the image processing device,
the image sequence may be an in vivo image sequence obtained by capturing inside of a living body, and
the cover area may be a bubble area or a residue area included in the image.

This makes it possible to detect a bubble area or a residue area as the cover area.

In the image processing device,
the processing section may detect an area of the image other than an area for which an image signal is not suitable for observation, as the observation target area.

This makes it possible to detect an area other than an area that is not suitable for observation as the observation target area.

In the image processing device,
the area for which the image signal is not suitable for observation may be a dark area or a halation area included in the image.

This makes it possible to detect a dark area or a halation area as an area of which the image signal is not suitable for observation.

In the image processing device,
the image sequence may be an in vivo image sequence obtained by capturing inside of a living body, and
the processing section may detect a lesion area or a villus area included in the image as the observation target area.

This makes it possible to detect a lesion area or a villus area as the observation target area.

Another embodiment of the invention relates to an information storage device storing a program that causes a computer to function as each section described above.

According to another embodiment of the invention, there is an image processing method comprising:
acquiring an image sequence that includes a plurality of constituent images;
detecting an observation target area from each constituent image among the plurality of constituent images;
selecting a reference image and a determination target image from the plurality of constituent images;
calculating deformation information about a deformation estimation target area included in the reference image and the deformation estimation target area included in the determination target image;
determining whether or not the determination target image can be deleted based on the observation target area included in the reference image, the observation target area included in the determination target image, and the deformation information; and
performing an image summarization process that deletes some of the plurality of constituent images included in the image sequence based on a determination result as to whether or not the determination target image can be deleted to generate a summary image sequence.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

1. Method

A method used in connection with several exemplary embodiments of the invention is described below. It is desirable to perform the image summarization process when an image sequence that includes a large number of temporally or spatially continuous images has been acquired, and the user performs a process (e.g., medical practice (e.g., diagnosis) when the image sequence is an endoscopic image sequence) using the image sequence. This is because the number of images included in the image sequence is very large, and it takes time for the user to check all of the images included in the image sequence to make a determination. Moreover, it is likely that similar images are included in the image sequence, and the amount of information that can be acquired is limited even if such similar images are thoroughly checked.

Specific examples of such an image sequence include an image sequence captured using a capsule endoscope. The capsule endoscope is a capsule-shaped endoscope that includes a small camera, and captures an image at given time intervals (e.g., twice a second). The capsule endoscope remains inside a body for several hours (tens or more hours in some cases) until it is discharged from the body, and several tens of thousands of captured images are acquired during a single examination. When the capsule endoscope moves inside a living body, the capsule endoscope may stop or move backward due to the motion of the living body, for example. Therefore, a large number of captured images may include a number of images that capture a similar object, and are not useful for diagnosis or the like.

The image summarization process may be performed so that a lesion area is detected from an image, an image from which a lesion area has been detected is allowed to remain in the summary image sequence, and an image from which a lesion area has not been detected is deleted. However, a lesion area may be detected from most of the images included in the acquired image sequence depending on the disease. In this case, since it is determined that most of the images cannot be deleted when the image summarization process is performed based on whether or not a lesion area has been detected, the effect of reducing the number of images is low, and it is difficult to reduce the burden imposed on the user (doctor).

Therefore, a known image summarization process (e.g., the process disclosed in JP-A-2009-5020 that extracts a scene change boundary image, or an image that represents the image sequence) may be performed on images from which a lesion area has been detected in order to improve the effect of reducing the number of images. However, such a known image summarization process does not take account of the relationship between the object captured within the deletion target image and the object captured within the image that is allowed to remain when deleting an image. Therefore, a lesion area that is captured within an image included in the image sequence that is not subjected to the image summarization process may not be captured within each image included in the image sequence obtained by the image summarization process. Since the degree by which a lesion area that is captured within an image included in the original image sequence is not included in each image included in the image sequence obtained by the image summarization process depends on the processing target image sequence, it is difficult to control the degree using a known method.

This is undesirable in the medical field since it is necessary to prevent a situation in which the attention area (e.g., lesion area) is missed as much as possible. Therefore, it is necessary to prevent a situation in which a lesion area that cannot be observed occurs due to deletion of a given image as much as possible when performing the image summarization process.

In order to solve the above problems, several aspects of the invention propose a method that selects a reference image (i.e., an image that is allowed to remain (an image that may be allowed to remain depending on the embodiment)) and a determination target image (i.e., a deletion determination target image), and performs the image summarization process based on deformation information about the reference image and the determination target image.

Figure 18:
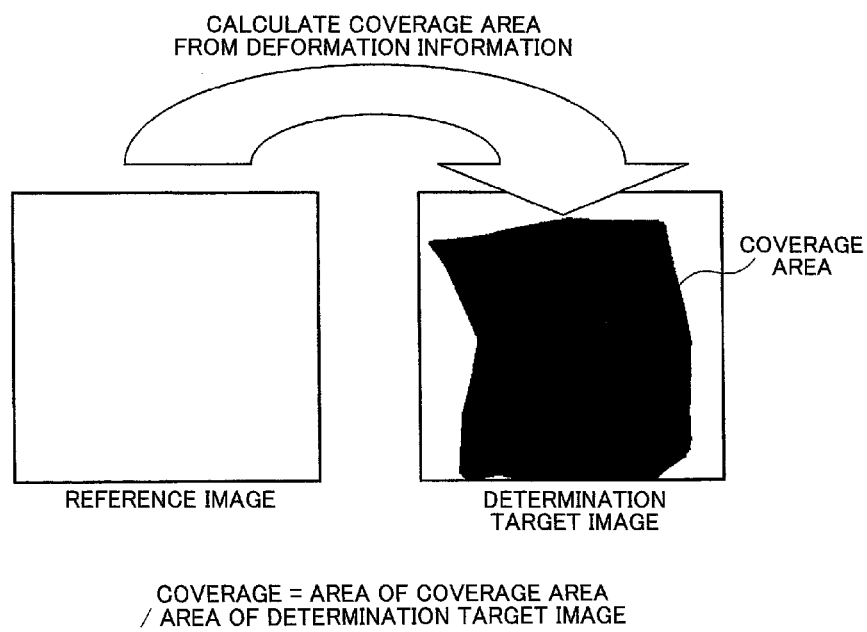
FIG. 18 is a view illustrating a method that calculates a coverage based on a coverage area.

For example, the image summarization process that utilizes the deformation information about the reference image and the determination target image may calculate a coverage area within the determination target image by deforming the reference image (see FIG. 18). The object captured within the reference image corresponds to the object captured within the coverage area within the determination target image. Specifically, an area (hereinafter referred to as "non-coverage area") that is included in the determination target image, and is not included in the coverage area cannot be covered by the reference image when the determination target image is deleted.

Therefore, the degree by which an object range that cannot be observed occurs is controlled by calculating the ratio of the coverage area with respect to the determination target image as the coverage, and determining whether or not to delete the determination target image based on the calculated coverage, for example. For example, the determination target image is deleted when the coverage is equal to or larger than a threshold value, and is not deleted when the coverage is less than the threshold value. In this case, the degree by which an area that cannot be observed occurs can be controlled by appropriately setting the threshold value.

However, when detecting a lesion area (observation area (described later) in a broad sense), a lesion area is the attention area within an image (see above). When a lesion area (attention area) has been detected, it is unreasonable to perform the process on the entire image (see FIG. 18), and equally handle a lesion area and an area other than a lesion area.

An example of such a situation is described below with reference to FIGS. 1A to 1C. Note that an extreme shape is used in FIGS. 1A to 1C for convenience of explanation. FIG. 1A illustrates a coverage area obtained by deforming the reference image using the deformation information, and projecting the deformed reference image onto the determination target image. In this case, it is considered that it is determined that the determination target image can be deleted since the coverage is high to a certain extent, although the determination result differs depending on the threshold value and the like used for the deletion determination process. In other words, the area (i.e., non-coverage area illustrated in FIG. 1A) that cannot be covered by the reference image when the determination target image is deleted is sufficiently small.

However, when a lesion area included in the reference image is an area indicated by A1 in FIG. 1B, the lesion area (hereinafter may be referred to as "lesion coverage area") included in the reference image that has been deformed using the deformation information corresponds to an area indicated by A2 within the determination target image. When a lesion area included in the determination target image is an area indicated by A3 in FIG. 1C, most of the lesion area (A3) included in the determination target image is included within the non-coverage area, and cannot be observed if the determination target image is deleted.

Figure 1B:
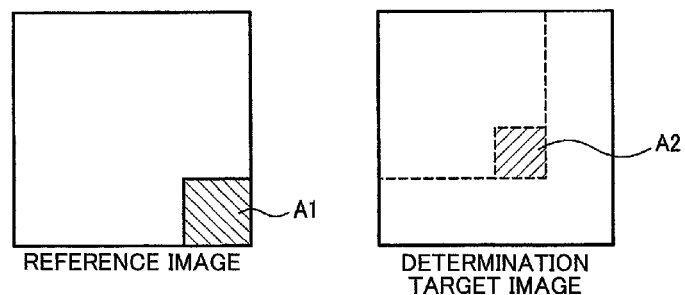
Figure 1C:
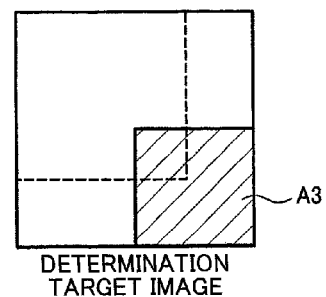

In the example illustrated in FIGS. 1A to 1C, the original lesion has a size corresponding to the lesion area indicated by A3 in FIG. 1C, but only the upper left part of the original lesion can be observed within the reference image in a magnified state. However, it is determined that the determination target image can be deleted when the coverage is calculated using the entire image (see FIG. 1A). Specifically, it may be determined that the determination target image that should be allowed to remain can be deleted by the determination process using the coverage that does not take account of a lesion area, and a situation in which a number of lesion areas cannot be observed may occur.

Figure 2:
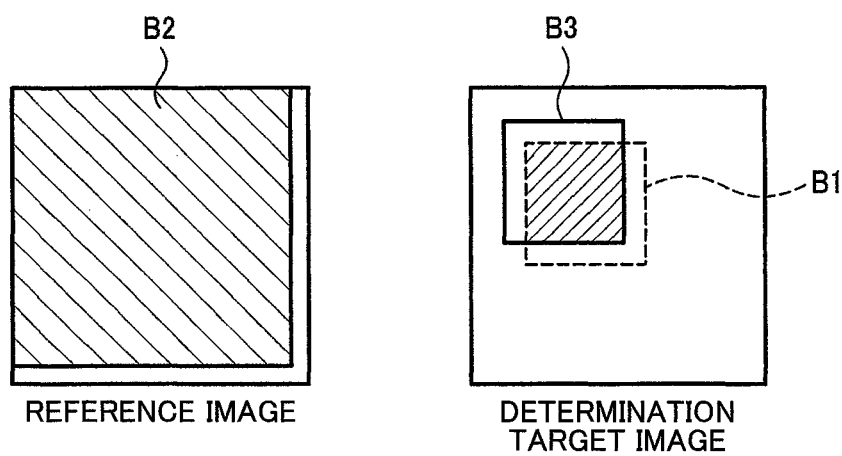
FIG. 2 is another view illustrating the reasons that a lesion area is used for an image summarization process.

In the example illustrated in FIG. 2, a coverage area indicated by B1 is obtained by deforming the reference image. A lesion area included in the reference image is an area indicated by B2, and a lesion area included in the determination target image is an area indicated by B3. In this case, it is determined that the determination target image cannot be deleted by the determination process using the coverage since the ratio of the coverage area with respect to the determination target image is small. However, most of the lesion area (B3) included in the determination target image is included within the lesion coverage area obtained by deforming the area indicated by B2, and the degree by which the lesion area cannot be observed is low even if the determination target image is deleted. In this case, since it is determined that the determination target image that should be deleted cannot be deleted by the determination process using the coverage that does not take account of a lesion area, the number of images included in the image sequence obtained by the image summarization process increases (i.e., the effect of reducing the number of images decreases), and the burden imposed on the user may increase.

In view of the above, several aspects of the invention propose a method that performs the image summarization process by performing the deletion determination process based on a lesion area instead of performing the deformation process using the deformation information on the entire image. Specifically, the deformation process using the deformation information is performed on a lesion area included in the reference image, and the lesion area is projected onto the determination target image to calculate the reference image lesion area deformation result (lesion coverage area) (see FIG. 3). Whether or not the determination target image can be deleted is determined based on the lesion area included in the determination target image and the calculated lesion coverage area. This makes it possible to prevent a situation in which the problem described above with reference to FIGS. 1A to 2 occurs, and appropriately control the degree by which a lesion area cannot be observed due to deletion of the determination target image (the degree by which a lesion area that cannot be observed occurs due to deletion of the determination target image).

Although an example has described above in which it is necessary to prevent a situation in which it becomes impossible to observe a lesion area due to deletion of the determination target image, it may be necessary to prevent a situation in which it becomes impossible to observe an area other than a lesion area due to deletion of the determination target image. For example, a mucous membrane is covered by bubbles or a residue in a bubble area and a residue area that may be detected using the method disclosed in JP-A-2007-313119 or JP-A-2010-115413. It is considered that bubbles or a residue may be observed as the observation target. However, a mucous membrane is normally given high observation priority, and a bubble area and a residue area are normally given low observation priority. Specifically, while a serious problem does not occur even when a bubble area and a residue area cannot be observed due to deletion of the determination target image, a serious problem occurs when an area other than a bubble area and a residue area cannot be observed due to deletion of the determination target image.

In a dark area and a halation area that may be detected using the method disclosed in JP-A-2012-16454 or JP-A-2011-234931, the visibility of the object is low since the brightness is very low or high, and the observation priority assigned to a dark area and a halation area is lower than that assigned to a correct exposure area. Specifically, while a serious problem does not occur even when dark area and a halation area cannot be observed due to deletion of the determination target image, a serious problem occurs when an area other than dark area and a halation area cannot be observed due to deletion of the determination target image.

Specifically, the processing target need not necessarily be limited to a lesion area. When an image includes a first area with high observation priority, and a second area with low priority as compared with the first area, the image summarization process may be performed by performing the deletion determination process based on the first area instead of performing the deformation process that utilizes the deformation information on the entire image. According to several embodiments of the invention, a lesion area, an area in which a mucous membrane is not covered (i.e., an area other than a bubble area and a residue area), and an area in which visibility is relatively high (i.e., an area other than a dark area and a halation area) are determined to be the observation target area, and the image summarization process is performed by performing the deletion determination process based on the observation target area.

Figure 17:
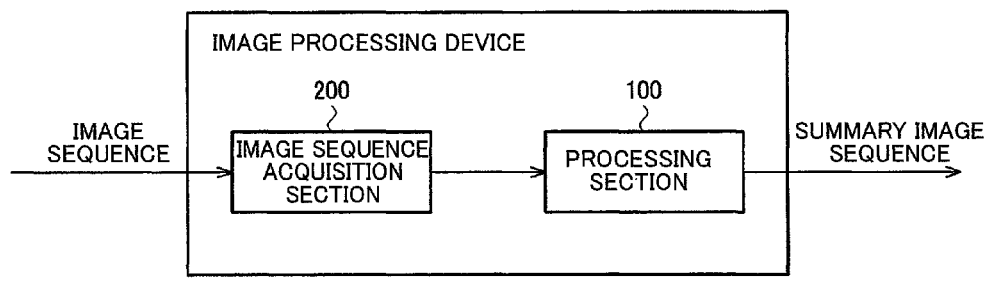
FIG. 17 illustrates a basic configuration example of an image processing device.

For example, an image processing device may include a processing section 100 and an image sequence acquisition section 200 (see FIG. 17). The image sequence acquisition section 200 acquires an image sequence that includes a plurality of constituent images. The processing section 100 performs an image summarization process that deletes some of the plurality of constituent images included in the image sequence acquired by the image sequence acquisition section 200 to generate a summary image sequence. The processing section 100 detects the observation target area from each constituent image among the plurality of constituent images, selects the reference image and the determination target image from the plurality of constituent images, calculates the deformation information about the deformation estimation target area included in the reference image and the deformation estimation target area included in the determination target image, and determines whether or not the determination target image can be deleted based on the observation target area included in the reference image, the observation target area included in the determination target image, and the deformation information.

First to third embodiments illustrate an example in which the observation target area is a lesion area. The first embodiment illustrates a method that calculates a lesion coverage as an index value based on the deformation information, a lesion area included in the reference image, and a lesion area included in the determination target image, and determines whether or not the determination target image can be deleted. The second embodiment illustrates a method that utilizes a lesion loss area occupancy as an index value. The details of each index value are described later. The third embodiment illustrates a combination of the first embodiment and the second embodiment, and modifications thereof. A fourth embodiment illustrates an example in which the observation target area is an area that excludes an area that cannot be observed. In this case, the area that cannot be observed is a bubble area, a residue area, a dark area, a halation area, or the like, and the observation target area is an area of an image other than a bubble area, a residue area, a dark area, a halation area, and the like.

2. First Embodiment

A method is described below that sets a lesion area to be the observation target area, and performs the deletion determination process that determines whether or not the determination target image can be deleted based on the lesion coverage (observation target coverage in a broad sense). A system configuration example of the image processing device will be described first, and the flow of the process will then be described using a flowchart.

2.1 System configuration Example

Figure 4:
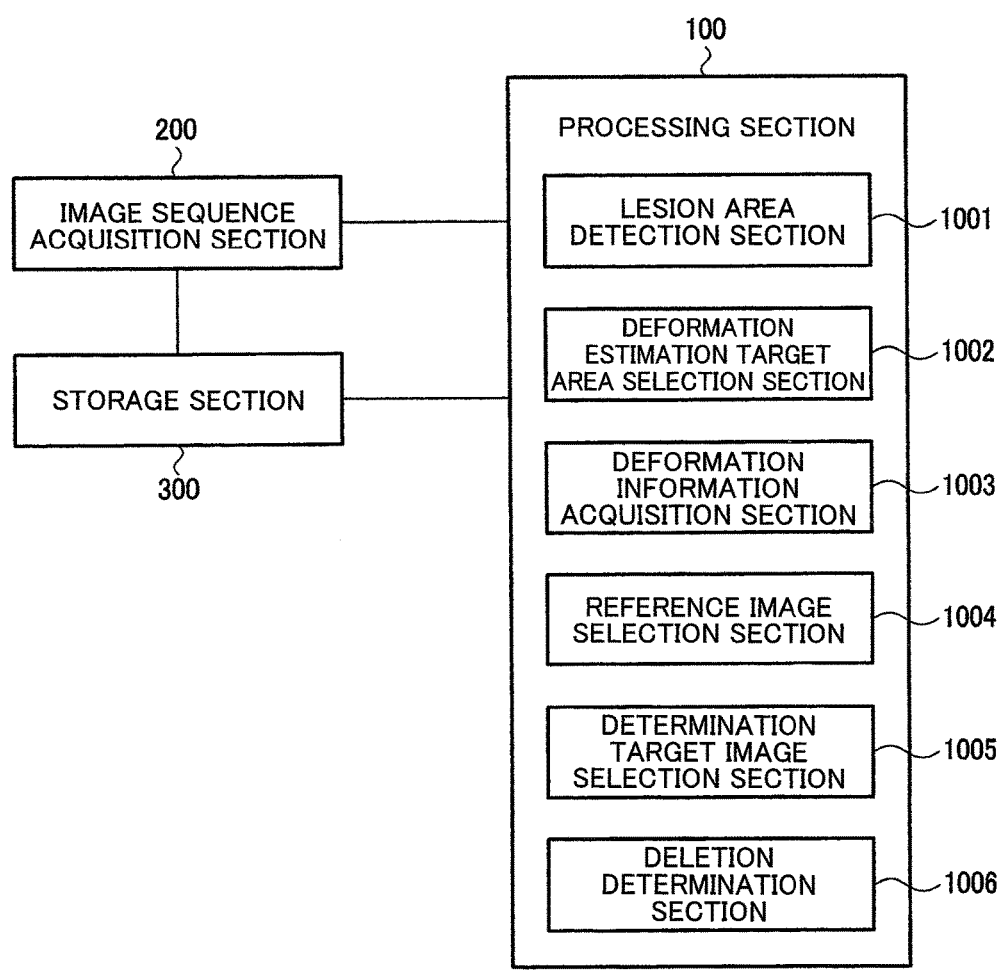
FIG. 4 illustrates a configuration example of an image processing device.

FIG. 4 illustrates a system configuration example of the image processing device according to the first embodiment. The image processing device includes a processing section 100, an image sequence acquisition section 200, and a storage section 300.

The processing section 100 performs the image summarization process that deletes some of a plurality of images included in an image sequence acquired by the image sequence acquisition section 200. The function of the processing section 100 may be implemented by hardware such as a processor (e.g., CPU) or an ASIC (e.g., gate array), a program, or the like.

The image sequence acquisition section 200 acquires the image sequence that is subjected to the image summarization process. The image sequence acquired by the image sequence acquisition section 200 may include RGB channel images that are arranged in time series. Alternatively, the image sequence acquired by the image sequence acquisition section 200 may be a spatially continuous image sequence (e.g., an image sequence that includes spatially arranged images that have been captured using imaging devices arranged in a row). Note that the images included in the image sequence are not limited to RGB channel images. Another color space (e.g., Gray channel image) may also be used.

The storage section 300 stores the image sequence acquired by the image sequence acquisition section 200, and serves as a work area for the processing section 100 and the like. The function of the storage section 300 may be implemented by a memory (e.g., RAM), a hard disk drive (HDD), or the like.

The processing section 100 may include a lesion area detection section 1001, a deformation estimation target area selection section 1002, a deformation information acquisition section 1003, a reference image selection section 1004, a determination target image selection section 1005, and a deletion determination section 1006 (see FIG. 4). Note that the configuration of the processing section 100 is not limited to the configuration illustrated in FIG. 4. Various modifications may be made, such as omitting some of the elements illustrated in FIG. 4, or adding other elements. Note that each section illustrated in FIG. 4 is provided to describe each subroutine when the image summarization process performed by the processing section 100 is divided into a plurality of subroutines. The processing section 100 does not necessarily include each section illustrated in FIG. 4 as an element.

The lesion area detection section 1001 detects a lesion area from each image included in the image sequence. Various types of disease (lesion area) may be detected, and a lesion area may be detected using various methods. For example, a lesion area may be detected using the method disclosed in JP-A-2010-113616, or may be detected using another method. Since an image from which a lesion area has not been detected is not useful for a lesion observation process and the like, it is unnecessary to allow an image from which a lesion area has not been detected to remain in the summary image sequence (i.e., the image sequence obtained by the image summarization process). Therefore, the lesion region detection process may be performed on the image sequence acquired by the image sequence acquisition section 200, and the subsequent process may be performed on an image from which a lesion area has been detected.

The deformation estimation target area selection section 1002 sets an area that is subjected to a deformation estimation process (i.e., a process that acquires the deformation information). In the first embodiment, a lesion area is subjected to the deformation process using the deformation information. Specifically, the process can be performed when deformation information sufficient to deform a lesion area (e.g., information that projects each pixel included in a lesion area onto the determination target image) is present. However, when only a lesion area is used to calculate the deformation information, the accuracy of the calculated deformation information may be low when the lesion area is small, for example. Therefore, the area used for the deformation estimation process may be selected as the deformation estimation target area. The entire area of the image may be selected as the deformation estimation target area, or the deformation estimation target area may be dynamically selected using information about a lesion area, or the like. The image processing device need not necessarily perform the selection process. For example, a value that has been set before shipment of the device may be used directly.

The deformation information acquisition section 1003 acquires the deformation information about two images using information about the deformation estimation target area. Note that the deformation information represents a shape (range) in which the range captured within one image is captured within the other image. The deformation information may be the deformation parameter disclosed in JP-A-2011-24763, for example. When determining whether or not the determination target image can be deleted, the deformation information acquisition section 1003 acquires the deformation information about the reference image selected by the reference image selection section 1004 and the determination target image selected by the determination target image selection section 1005, and the deletion determination process is performed based on the acquired deformation information.

Note that the deformation information acquisition section 1003 need not necessarily directly calculate the deformation information about the reference image and the determination target image. For example, the deformation information about contiguous images included in the processing target image sequence may be calculated, and the deformation information about non-contiguous images may be calculated by combining the deformation information about contiguous images. In this case, the deformation information about the reference image and the determination target image is calculated by combining the deformation information (all of the deformation information in a narrow sense) about the reference image, the determination target image, and contiguous images between the reference image and the determination target image.

This makes it possible to reduce the processing load when performing the deformation information calculation process. Specifically, the deformation information can be calculated using the method disclosed in JP-A-2011-24763, for example. The processing load when performing the process that combines a plurality of pieces of deformation information is normally very low as compared with the process that calculates the deformation information from the beginning. For example, when the deformation information is a matrix, the processing load when performing a process that calculates the matrix from two pieces of image information is heavy, while it is very easy to synthesize a plurality of matrices calculated in advance (since it suffices to calculate the product of the matrices, for example).

For example, when the image sequence acquired by the image sequence acquisition section 200 includes N images, two images can be selected from the image sequence in N×(N−1)/2 combinations. Therefore, when directly calculating the deformation information about the reference image and the determination target image, the heavy-load process that calculates the deformation information from the beginning may be performed $N^2$ times. On the other hand, it suffices to perform the heavy-load process N−1 times when using the deformation information about contiguous images.

The reference image selection section 1004 selects the reference image from a plurality of images included in a partial image sequence. The determination target image selection section 1005 selects an image among the plurality of images included in the partial image sequence that differs from the reference image as the determination target image.

The deletion determination section 1006 performs the deletion determination process that determines whether or not the determination target image can be deleted based on the deformation information about the reference image and the determination target image. In the first embodiment, the deletion determination section 1006 performs the deletion determination process that determines whether or not the determination target image can be deleted based on the lesion coverage that represents the degree by which the lesion area included in the determination target image is covered by the lesion area included in the reference image.

Figure 5:
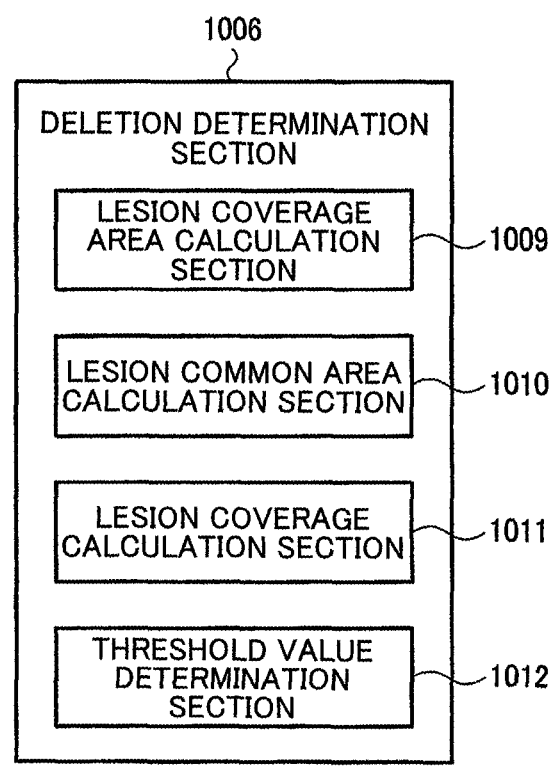
FIG. 5 illustrates a configuration example of a deletion determination section according to a first embodiment.

As illustrated in FIG. 5, the deletion determination section 1006 may include a lesion coverage area calculation section 1009, a lesion common area calculation section 1010, a lesion coverage calculation section 1011, and a threshold value determination section 1012. Note that the configuration of the deletion determination section 1006 is not limited to the configuration illustrated in FIG. 5. Various modifications may be made, such as omitting some of the elements illustrated in FIG. 5, or adding other elements.

The lesion coverage area calculation section 1009 deforms a lesion area included in the reference image, and projects the deformed lesion area onto the determination target image by utilizing the deformation information (deformation parameter) about the two images to calculate the lesion coverage area. The lesion common area calculation section 1010 calculates a lesion common area that is a common area of the calculated lesion coverage area and a lesion area included in the determination target image.

The lesion coverage calculation section 1011 calculates the lesion coverage based on the lesion coverage area. The lesion coverage is the ratio of the lesion common area with respect to the lesion area included in the determination target image (i.e., an area that is included in the lesion area included in the determination target image, and is covered by the lesion area included in the reference image). The lesion coverage is calculated as the area ratio of the lesion common area to the lesion area included in the determination target image.

The threshold value determination section 1012 compares the calculated lesion coverage with a given threshold value. The lesion area included in the determination target image is sufficiently covered by the lesion area included in the reference image when the lesion coverage is equal to or larger than the threshold value. In this case, it is determined that the determination target image can be deleted. The degree by which the lesion area cannot be observed due to deletion of the determination target image is high when the lesion coverage is less than the threshold value. In this case, it is determined that the determination target image cannot be deleted.

Figure 3:
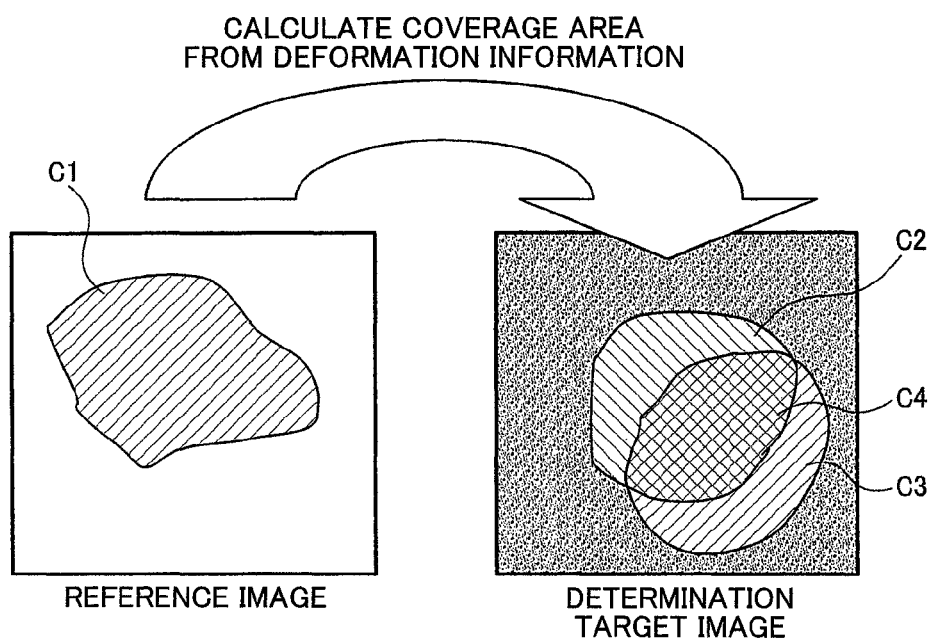
FIG. 3 is a view illustrating a process according to one embodiment of the invention.

FIG. 3 illustrates the process performed by the deletion determination section 1006. The lesion coverage area calculation section 1009 deforms the lesion area (C1) included in the reference image, and projects the deformed lesion area onto the determination target image to calculate the lesion coverage area (C2). The lesion common area calculation section 1010 calculates the common area of the lesion area (C3) included in the determination target image and the lesion coverage area (C2) as the lesion common area (C4). The lesion coverage calculation section 1011 calculates the lesion coverage by calculating the area ratio "(lesion common area C4)/(lesion area C3)", and the threshold value determination section 1012 compares the calculated lesion coverage with a given threshold value.

2.2 Flow of Process

Figure 6:
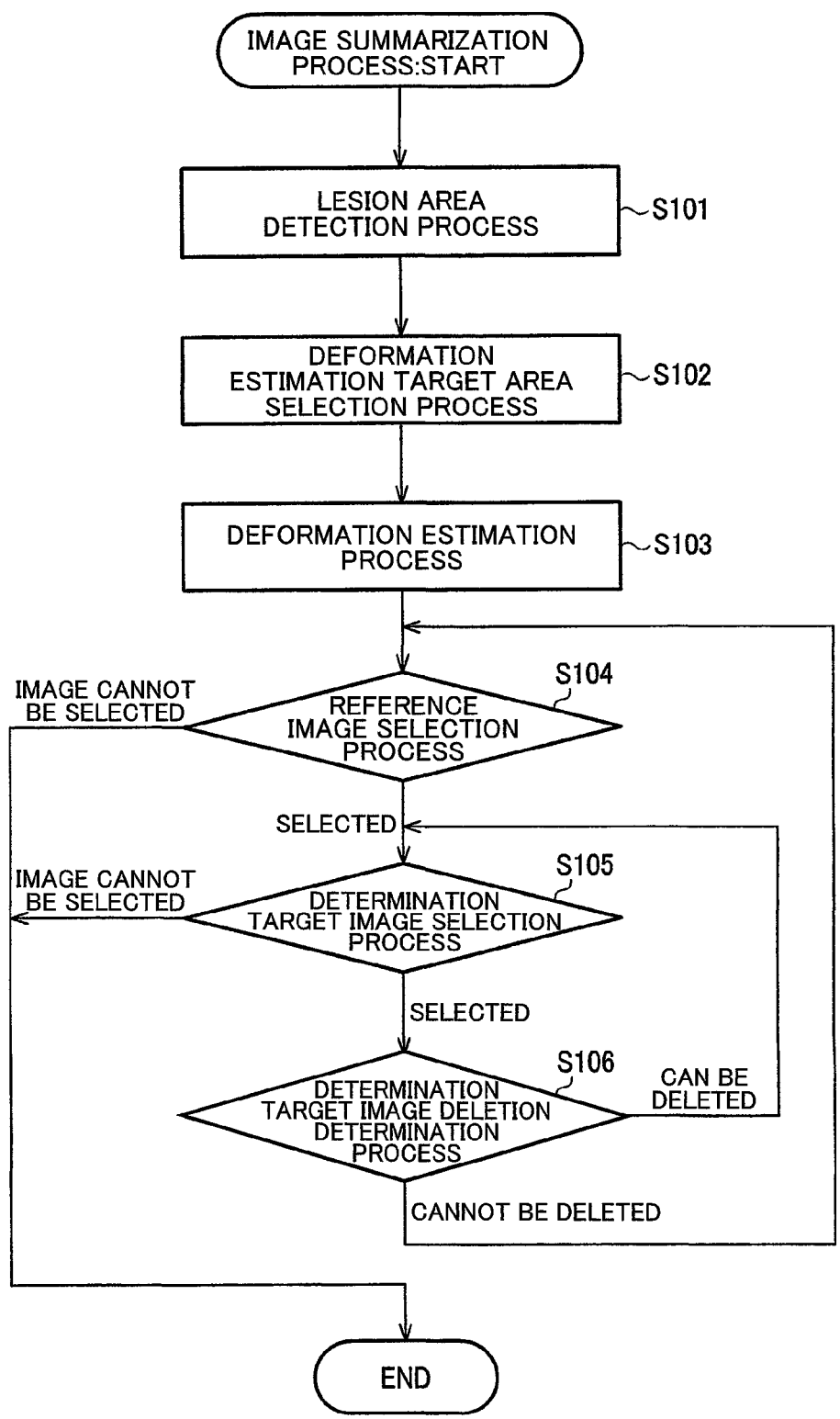
FIG. 6 is a flowchart illustrating a process according to one embodiment of the invention.

The flow of the image summarization process according to the first embodiment is described below with reference to FIG. 6 (flowchart). A lesion area is detected from each image included in the image sequence acquired by the image sequence acquisition section 200 (S101). The subsequent process is performed on an image from which a lesion area has been detected in the step S101.

The deformation estimation target area used for the deformation estimation process is selected (S102), and the deformation estimation process is performed using the selected deformation estimation target area (S103). The deformation estimation process corresponds to the process that calculates the deformation information about two contiguous images based on the deformation estimation target area.

The reference image is selected from the image sequence (S104). When the step S104 is performed for the first time, the first image included in the image sequence may be selected as the reference image. When the step S104 is performed for the second or subsequent time (i.e., when the step S104 is performed after the step S106), the determination target image that has been determined to be allowed to remain by the deletion determination process in the step S106 is selected as the next reference image. The selected reference image is allowed to remain in the summary image sequence. Note that the image summarization process is terminated when the reference image cannot be selected from the partial image sequence due to an error or the like.

When the reference image has been selected, the determination target image is selected from the images included in the image sequence (S105). The determination target image is selected from the images that follow the reference image in the image sequence. More specifically, when the step S105 is performed for the first time after the reference image has been selected or updated in the step S104, the image that immediately follows the reference image is selected as the determination target image. When the kth image from the reference image has been selected as the determination target image, the (k+1)th image from the reference image (i.e., the selection position is shifted by 1) is selected as the next determination target image. When the deletion determination process has been performed on the last image included in the image sequence, the determination target image cannot be selected in the step S105. In this case, the image summarization process is terminated.

When the reference image and the determination target image have been selected, whether or not the determination target image can be deleted is determined based on the deformation information about the reference image and the determination target image calculated in the step S103 (or acquired by combining a plurality of pieces of deformation information calculated in the step S103), the lesion area detected from the reference image, and the lesion area detected from the determination target image (S106).

Figure 7:
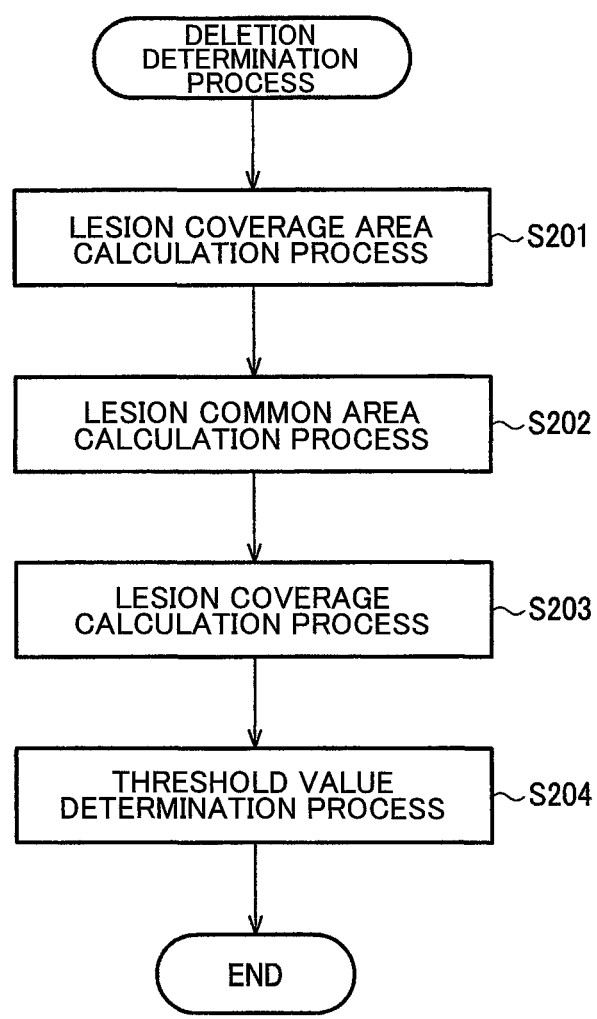
FIG. 7 is a flowchart illustrating the deletion determination section according to the first embodiment.

The flow of the deletion determination process performed in the S106 is described below with reference to FIG. 7 (flowchart). The lesion area included in the reference image is deformed using the deformation information (deformation parameter) to calculate the lesion coverage area (S201). The common area of the lesion area included in the determination target image and the calculated lesion coverage area is calculated as the lesion common area (S202), and the ratio of the lesion common area with respect to the lesion area included in the determination target image is calculated as the lesion coverage (S203). The calculated lesion coverage is compared with a given threshold value (S204) to determine whether or not the determination target image can be deleted.

When it has been determined that the determination target image can be deleted in the step S106, the determination target image is updated (S105). When it has been determined that the determination target image cannot be deleted (i.e., the lesion area included in the determination target image cannot be covered by the reference image) in the step S106, it is necessary to allow the determination target image to remain in the summary image sequence. Therefore, the determination target image that has been determined to be allowed to remain in the step S106 is selected as the next reference image in the step S104.

Figure 8A:
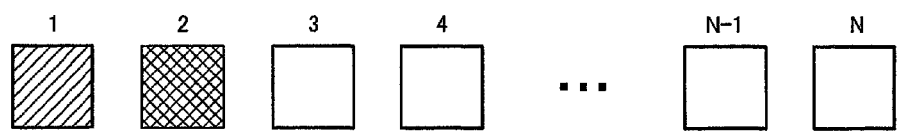
FIGS. 8A to 8C are views illustrating a reference image/ determination target image selection method.
Figure 8B:
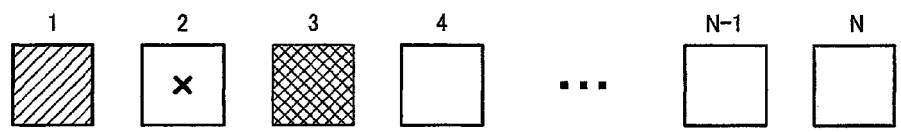
Figure 8C:
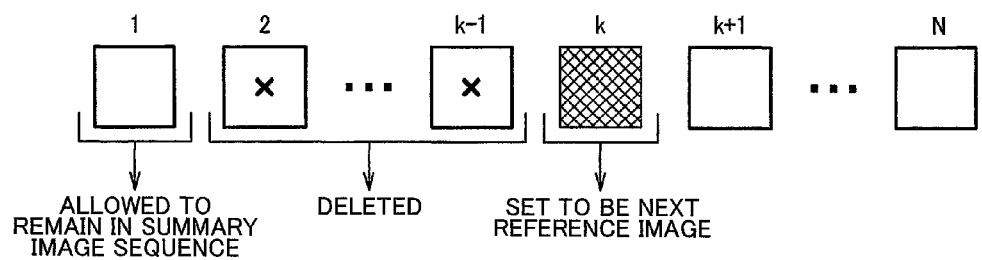

FIGS. 8A to 8C illustrate the image summarization process that is performed on the image sequence as described above. As illustrated in FIG. 8A, the image sequence includes N images. The first image included in the image sequence is selected as the reference image, and the second image included in the image sequence is selected as the determination target image. The lesion coverage of the determination target image by the reference image is calculated, and whether or not the determination target image can be deleted is determined.

When it has been determined that the determination target image can be deleted, the next determination target image is selected. Specifically, the third image is selected as the determination target image (i.e., the position of the determination target image is shifted backward) (see FIG. 8B). Whether or not the determination target image can be deleted is determined using the reference image and the new determination target image, and the determination target image is updated until it is determined that the determination target image cannot be deleted.

When it has been determined that the second to (k−1)th images can be deleted (i.e., the lesion areas included in the second to (k−1)th images are covered by the reference image to the extent set based on the threshold value), and the kth image cannot be deleted (see FIG. 8C), the second to (k−1)th images are deleted (i.e., the second to (k−1)th images are not allowed to remain in the summary image sequence). Since most of the lesion area included in the kth image is lost when the kth image is deleted even if the reference image is allowed to remain in the summary image sequence, it is necessary to allow the kth image to remain in the summary image sequence. Therefore, the kth image is set to be the next reference image.

When the next reference image has been selected, the image that immediately follows the selected reference image is selected as the determination target image, and the process illustrated in FIGS. 8A to 8C is performed. The subsequent process is performed in the same manner as described above. When it has been determined that the determination target image can be deleted, the subsequent image is selected as the determination target image. When it has been determined that the determination target image cannot be deleted, the determination target image that cannot be deleted is selected as the reference image. When the deletion determination process has been performed on all of the images included in the image sequence, the process is terminated.

2.3 Modifications

The reference image/determination target image selection method may be modified in various ways. For example, a plurality of reference images may be selected. In this case, the number of lesion areas corresponds to the number of images selected as the reference image, and the lesion area included in the determination target image that is covered by at least one of the lesion areas is not lost even if the determination target image is deleted. Therefore, an area that corresponds to the sum set of an area calculated by deforming the lesion area included in each reference image may be used as the lesion coverage area (see FIG. 9). The lesion common area calculation process, the lesion coverage calculation process, and the determination process using the threshold value after calculating the lesion coverage area are performed in the same manner as described above.

A plurality of reference images may be selected by selecting one reference image that precedes the determination target image, and one reference image that follows the determination target image (two reference images in total) (see FIGS. 10A and 10B). In this case, the images between the two reference images are sequentially selected as the determination target image. When it has been determined that all of the images between the two reference images can be deleted, the two reference images are allowed to remain in the summary image sequence, and the images between the two reference images are deleted. This makes it possible to implement the deletion determination process that ensures that the degree by which a lesion area is lost due to deletion of an image is equal to or lower than a given value.

When performing the deletion determination process taking account of a reduction in the number of summary images, a position may be searched that satisfies the conditions whereby all of the images between the first reference image (forward reference image) and the second reference image (backward reference image) can be deleted, and the first reference image and the second reference image are situated farthest from each other. In this case, when the first reference image has been determined, the value k is searched that satisfies the conditions whereby all of the images between the first reference image and the second reference image can be deleted when the kth image is selected as the second reference image, and at least one of the images between the first reference image and the second reference image cannot be deleted when the (k+1)th image is selected as the second reference image. When the value k that satisfies the above conditions has been found, the kth image is selected as the next first reference image, and the second reference image is selected from the images that follow the kth image (first reference image). The deletion determination process is performed while sequentially selecting the images between the first reference image and the second reference image as the determination target image, and the process is performed that searches the next second reference image that satisfies the conditions whereby all of the images between the first reference image and the second reference image can be deleted, and the first reference image and the second reference image are situated farthest from each other. When using this method, the second reference image is a candidate for an image that is allowed to remain in the summary image sequence, while the first reference image is necessarily allowed to remain in the summary image sequence.

Note that the reference image and the determination target image may be selected using various other methods.

According to the first embodiment, the image processing device includes the image sequence acquisition section 200 that acquires an image sequence that includes a plurality of constituent images, and the processing section 100 that performs the image summarization process that deletes some of the plurality of constituent images included in the image sequence acquired by the image sequence acquisition section 200 to generate a summary image sequence (see FIG. 4). The processing section 100 detects the observation target area from each constituent image among the plurality of constituent images, selects the reference image and the determination target image from the plurality of constituent images, and calculates the deformation information about the deformation estimation target area included in the reference image and the deformation estimation target area included in the determination target image. The processing section 100 determines whether or not the determination target image can be deleted based on the observation target area included in the reference image, the observation target area included in the determination target image, and the deformation information.

The term "observation target area" used herein refers to an area of an image that should be observed with high priority over other areas, or an area of an image that can be observed. The observation target area may be a lesion area as described above in connection with the first embodiment, or may be an area other than a bubble area, a residue area, a dark area, and a halation area as described later in connection with the fourth embodiment.

The term "deformation estimation target area" used herein refers to an area that is processed when calculating the deformation information about images (particularly the deformation information about the reference image and the determination target image). The deformation estimation target area may be the entire image, or may be part of the image. The processing section 100 may select the deformation estimation target area, or the deformation estimation target area may be set in advance.

This configuration makes it possible to determine whether or not the determination target image can be deleted based on the observation target area detected from the reference image, the observation target area detected from the determination target image, and the deformation information. It is possible to appropriately control the degree by which the object cannot be observed due to deletion of an image by utilizing the deformation information. In particular, it is possible to suppress a situation in which a lesion is missed when performing the image summarization process on in vivo images captured using an endoscope apparatus. When the observation target area is not used, an image that should not be deleted may be deleted (see FIGS. 1A to 1C), or an image that should be deleted cannot be deleted (see FIG. 2). The method according to the first embodiment can solve these problems.

The processing section 100 may calculate the observation target coverage area by performing the deformation process using the deformation information on the observation target area included in the reference image, the observation target coverage area being an area that is included in the determination target image, and is covered by the observation target area included in the reference image. The processing section 100 may determine whether or not the determination target image can be deleted based on the calculated observation target coverage area, and the observation target area included in the determination target image.

The observation target coverage area corresponds to the lesion coverage area described above in a narrow sense. Note that the observation target coverage area may be an area obtained by deforming the observation target area included in the reference image calculated by the method described later in connection with fourth embodiment using the deformation information. Note that other pieces of information calculated based on a lesion area can also be extended to information calculated based on the observation area that is a term that includes a lesion area in the same manner as the lesion coverage area that can be extended to the observation target coverage area.

This makes it possible to calculate the observation target coverage area (C2 in the example illustrated in FIG. 3) by deforming the observation target area (C1 in the example illustrated in FIG. 3) included in the reference image, and determine whether or not the determination target image can be deleted based on the calculated observation target coverage area, and the observation target area (C3 in the example illustrated in FIG. 3) included in the determination target image. Since the observation target coverage area corresponds to the observation target area that can be observed even if the determination target image is deleted by allowing the reference image to remain, it is possible to appropriately control the degree by which the observation target area cannot be observed by utilizing the observation target coverage area, and the observation target area included in the determination target image.

The processing section 100 may calculate the observation target common area that is a common area of the observation target coverage area and the observation target area included in the determination target image, and calculate the observation target coverage that is the ratio of the calculated observation target common area with respect to the observation target area included in the determination target image. The processing section 100 may determine whether or not the determination target image can be deleted based on the calculated observation target coverage.

More specifically, the processing section 100 may determine that the determination target image can be deleted when the observation target coverage is equal to or larger than a given threshold value. The processing section 100 may determine that the determination target image cannot be deleted when the observation target coverage is smaller than the given threshold value.

The observation target common area corresponds to the observation target coverage area described above in a narrow sense, and the observation target coverage corresponds to the lesion coverage described above in a narrow sense.

This makes it possible to calculate the observation target coverage based on the observation target common area (C4 in the example illustrated in FIG. 3), and determine whether or not the determination target image can be deleted. Since the observation target common area is an area that is included in the observation target area included in the determination target image, and is covered by the observation target area included in the reference image, the observation target coverage is an index value that represents the degree of coverage of the observation target area included in the determination target image by the observation target area included in the reference image. Therefore, the determination target image can be deleted when the observation target coverage is high, and cannot be deleted when the observation target coverage is low. Specifically, whether or not the observation target coverage is equal to or larger than a given threshold value may be determined.

The image sequence may be an in vivo image sequence obtained by capturing the inside of a living body, and the processing section 100 may detect a lesion area or a villus area included in an image as the observation target area.

The term "villus" refers to a protrusion that is present on the inner wall of an intestine, and the term "villus area" refers to an area of an image for which it has been determined that villi are captured.

This makes it possible to implement the image summarization process that suppresses a situation in which a lesion area or a villus area (i.e., observation target area) cannot be observed due to deletion of an image. Since a lesion area is very important when diagnosing or treating a subject, it is very advantageous to allow a lesion area to be observed after performing the image summarization process. It has been known that resistance to bacteria decreases when villous atrophy has occurred. Therefore, it is useful to observe a villus area in order to determine the condition of a subject, and a villus area can be considered in the same manner as a lesion area.

Note that part or most of the process performed by the image processing device and the like according to the first embodiment may be implemented by a program. In this case, the image processing device and the like according to the first embodiment are implemented by causing a processor (e.g., CPU) to execute a program. Specifically, a program stored in an information storage device is read, and executed by a processor (e.g., CPU). The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the first embodiment based on the program (data) stored in the information storage device. Specifically, a program that causes a computer (i.e., a device that includes an operation section, a processing section, a storage section, and an output section) to function as each section according to the first embodiment (i.e., a program that causes a computer to execute the process implemented by each section) is stored in the information storage device.

The image processing device and the like according to the embodiments of the invention may include a processor and a memory. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an application-specific integrated circuit (ASIC). The memory stores a computer-readable instruction. Each section of the image processing device and the like according to the embodiments of the invention is implemented by causing the processor to execute the instruction. The memory may be a semiconductor memory (e.g., SRAM or DRAM), a register, a hard disk, or the like. The instruction may be an instruction included in an instruction set of a program, or may be an instruction that causes a hardware circuit of the processor to operate.

3. Second Embodiment

A method that implements the deletion determination process using a lesion area as the observation target area, and using a lesion loss area occupancy (observation target loss area occupancy in a broad sense) as an index value, is described below. A configuration example of the image processing device according to the second embodiment is the same as that illustrated in FIG. 4 (except for the process performed by the deletion determination section 1006), and detailed description thereof is appropriately omitted. The flow of the process according to the second embodiment is the same as that illustrated in FIG. 6 (flowchart) (except for the process performed in the step S106), and detailed description thereof is appropriately omitted.

3.1 Deletion Determination Process that Utilizes Lesion Loss Area Occupancy

Figure 11A:
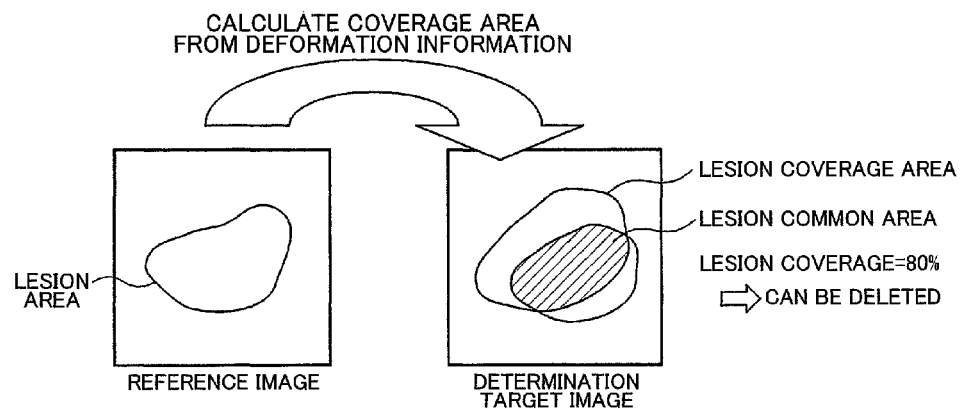
FIGS. 11A to 11D are views illustrating a process according to a second embodiment.
Figure 11B:
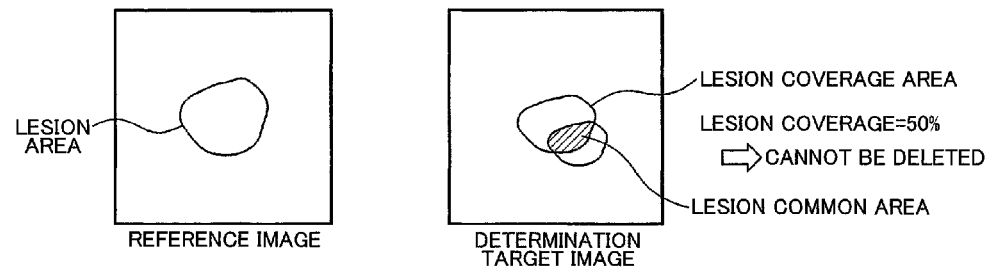

The reason that the deletion determination process that utilizes the lesion loss area occupancy is performed is described below with reference to FIGS. 11A to 11D. FIGS. 11A and 11B illustrate an example in which the lesion coverage area and the lesion common area are calculated in the same manner as in FIG. 3 when a lesion area is included in the reference image and the determination target image as illustrated in FIGS. 11A and 11B. In the example illustrated in FIG. 11A, since the ratio of the lesion common area with respect to the lesion area included in the determination target image is large (80%), it is determined that the determination target image can be deleted by the determination process based on the lesion coverage area. In the example illustrated in FIG. 11B, since the ratio of the lesion common area with respect to the lesion area included in the determination target image is small (50%), it is determined that the determination target image cannot be deleted by the determination process based on the lesion coverage area.

Figure 11C:
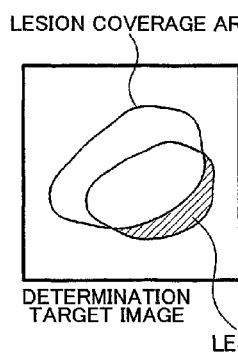
Figure 11D:
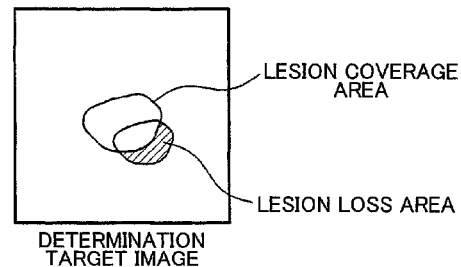

However, the above determination is questionable taking account of the size of an area (hereinafter referred to as "lesion loss area" (i.e., a lesion area that cannot be observed within the reference image when the determination target image is deleted)) that is included in the lesion area included in the determination target image, but is not included in the lesion common area. FIG. 11C illustrates the lesion loss area in the example illustrated in FIG. 11A, and FIG. 11D illustrates the lesion loss area in the example illustrated in FIG. 11B. As is clear from FIGS. 11C and 11D, the lesion loss area illustrated in FIG. 11C is larger than the lesion loss area illustrated in FIG. 11D. Specifically, the effect of reducing the number of images decreases due to the determination process based on the lesion coverage by allowing the large lesion loss area illustrated in FIG. 11C to be lost by deleting the determination target image illustrated in FIG. 11A, and allowing the determination target image illustrated in FIG. 11B to remain in order to protect the small lesion loss area illustrated in FIG. 11D.

In the second embodiment, whether or not the determination target image can be deleted is determined using an index value that is set from a viewpoint differing from that of the lesion coverage in order to deal with the above problem. Specifically, the lesion loss area is calculated as illustrated in FIGS. 11C and 11D, and whether or not the determination target image can be deleted is determined using the size of the calculated lesion loss area. However, the size (area) of an area (e.g., the number of pixels included in an area) differs relatively depending on the size (area) of the entire image. For example, a 50,000-pixel area within an image having a total number of pixels of 100,000 is considered to be a large area that covers half of the image, and a 50,000-pixel area within an image having a total number of pixels of 1,000,000 is considered to be a small area that occupies only a small part of the image. Therefore, the ratio of the lesion loss area with respect to the determination target image is used for the deletion determination process as the lesion loss area occupancy instead of using the size (area) of the lesion loss area.

3.2 System Configuration Example

Figure 12:
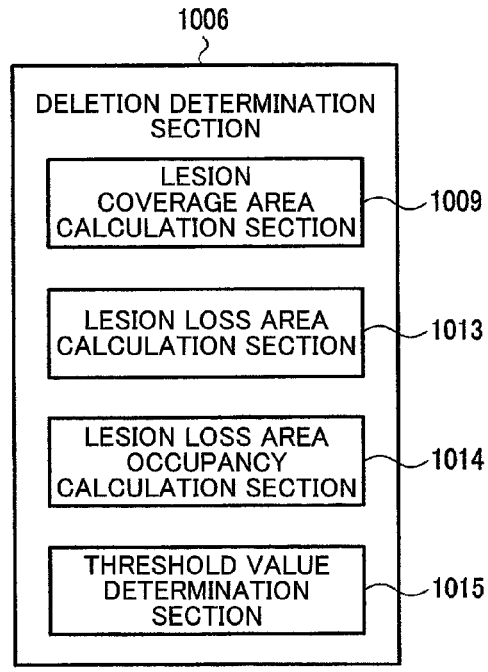
FIG. 12 illustrates a configuration example of a deletion determination section according to the second embodiment.

A configuration example of the image processing device according to the second embodiment is the same as that illustrated in FIG. 4. FIG. 12 illustrates a configuration example of the deletion determination section 1006 according to the second embodiment. As illustrated in FIG. 12, the deletion determination section 1006 may include a lesion coverage area calculation section 1009, a lesion loss area calculation section 1013, a lesion loss area occupancy calculation section 1014, and a threshold value determination section 1015. Note that the configuration of the deletion determination section 1006 is not limited to the configuration illustrated in FIG. 12. Various modifications may be made, such as omitting some of the elements illustrated in FIG. 12, or adding other elements.

The lesion coverage area calculation section 1009 deforms a lesion area included in the reference image, and projects the deformed lesion area onto the determination target image to calculate the lesion coverage area (see the first embodiment). The lesion loss area calculation section 1013 calculates the lesion loss area from the calculated lesion coverage area and a lesion area included in the determination target image. The lesion loss area may be calculated by excluding the lesion coverage area from the lesion area included in the determination target image.

The lesion loss area occupancy calculation section 1014 calculates the lesion loss area occupancy based on the lesion loss area. The lesion loss area occupancy is the ratio of the lesion loss area with respect to the determination target image (i.e., an area that is included in the lesion area included in the determination target image, and is not covered by the lesion area included in the reference image).

The lesion loss area occupancy is calculated as the area ratio of the lesion loss area to the determination target image.

The threshold value determination section 1015 compares the calculated lesion loss area occupancy with a given threshold value. When the lesion loss area occupancy is smaller than the threshold value, the size (i.e., the relative size based on the size of the entire determination target image) of an area that is included in the lesion area included in the determination target image, and cannot be observed due to deletion of the determination target image is sufficiently small. Therefore, it is determined that the determination target image can be deleted. When the lesion loss area occupancy is equal to or larger than the threshold value, the degree by which the lesion area cannot be observed due to deletion of the determination target image is high. Therefore, it is determined that the determination target image cannot be deleted.

Figure 13:
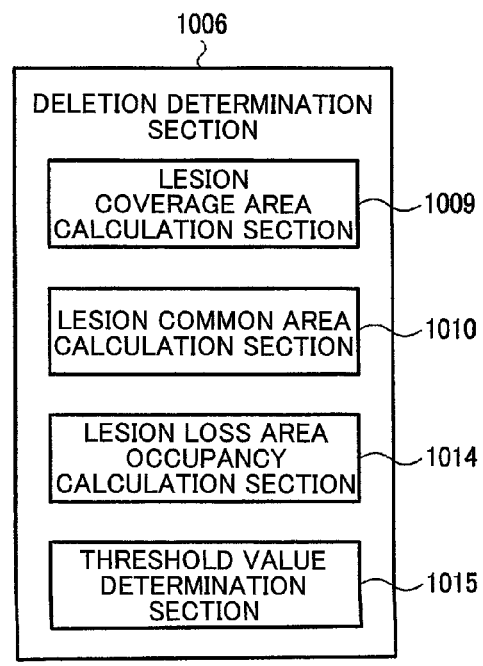
FIG. 13 illustrates another configuration example of the deletion determination section according to the second embodiment.

Note that the deletion determination section 1006 according to the second embodiment may not directly calculate the lesion loss area. Specifically, the deletion determination section 1006 may include a lesion coverage area calculation section 1009, a lesion common area calculation section 1010, a lesion loss area occupancy calculation section 1014, and a threshold value determination section 1015 (see FIG. 13).

In this case, the lesion coverage area calculation section 1009 deforms the lesion area (C1) included in the reference image, and projects the deformed lesion area onto the determination target image to calculate the lesion coverage area (C2), and the lesion common area calculation section 1010 calculates the common area of the lesion area (C3) included in the determination target image and the lesion coverage area (C2) as the lesion common area (C4) (see the first embodiment) (see FIG. 3). The size (area) of the lesion loss area is calculated by subtracting the size (area) of the lesion common area from the size (area) of the lesion area included in the determination target image. Therefore, the lesion loss area occupancy calculation section 1014 calculates the lesion loss area occupancy by calculating the area ratio "(lesion area C3-lesion common area C4)/(lesion area C3)", and the threshold value determination section 1015 compares the calculated lesion loss area occupancy with a given threshold value.

3.3 Flow of Process

Figure 14:
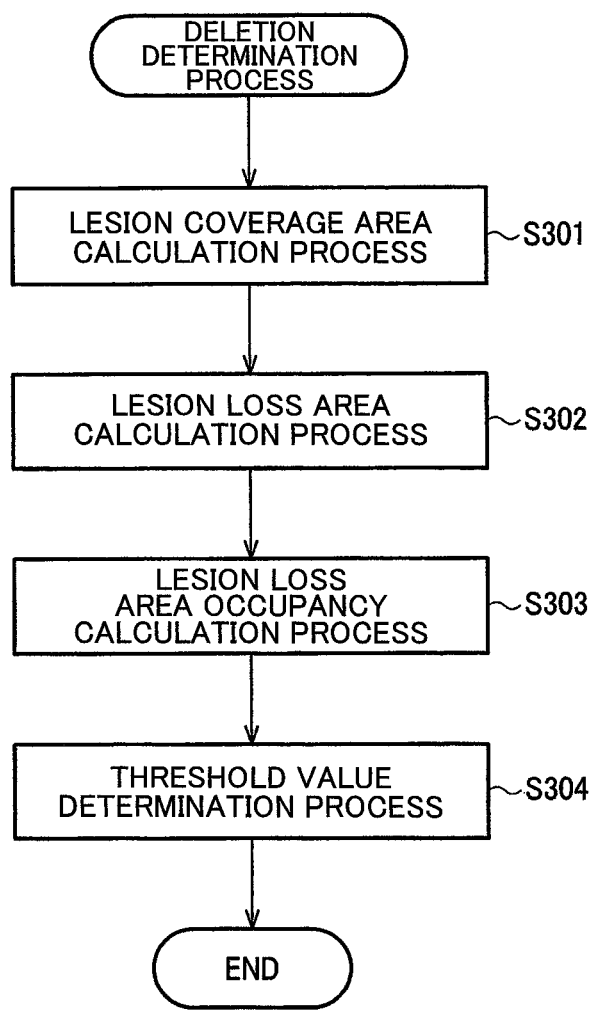
FIG. 14 is a flowchart illustrating the deletion determination section according to the second embodiment.

The flow of the deletion determination process according to the second embodiment is described below with reference to FIG. 14 (flowchart). The lesion area included in the reference image is deformed using the deformation information (deformation parameter) to calculate the lesion coverage area (S301). An area that is included in the lesion area included in the determination target image, but is not included in the calculated lesion coverage area is calculated as the lesion loss area (S302), and the ratio of the lesion loss area with respect to the determination target image is calculated as the lesion loss area occupancy (S303). The calculated lesion loss area occupancy is compared with a given threshold value (S304) to determine whether or not the determination target image can be deleted.

According to the second embodiment, the processing section 100 calculates the observation target loss area occupancy that is the ratio of the observation target loss area with respect to the determination target image, the observation target loss area being an area that is included in the observation target area included in the determination target image, but is not included in the observation target coverage area. The processing section 100 determines whether or not the determination target image can be deleted based on the calculated observation target loss area occupancy.

More specifically, the processing section 100 may determine that the determination target image can be deleted when the observation target loss area occupancy is smaller than a given threshold value. The processing section 100 may determine that the determination target image cannot be deleted when the observation target loss area occupancy is equal to or larger than the given threshold value.

This makes it possible to perform the deletion determination process based on the observation target loss area occupancy. As illustrated in FIGS. 11A to 11D, the determination process that utilizes the observation target coverage is performed based on the observation target area included in the determination target image, and does not take account of the size of the observation target area that cannot be observed due to deletion of the determination target image. Specifically, the determination process that utilizes the observation target coverage allows a situation in which the relatively large area illustrated in FIG. 11C cannot be observed, and does not allow a situation in which the relatively small area illustrated in FIG. 11D cannot be observed. Since whether or not the determination target image can be deleted is determined based on the ratio of the observation target loss area with respect to the determination target image when using the observation target loss area occupancy, it is possible to appropriately determine whether or not the determination target image can be deleted. Note that the observation target loss area occupancy is an index value that represents an area that cannot be observed due to deletion of the determination target image. Therefore, the determination target image can be deleted when the observation target loss area occupancy is low, and cannot be deleted when the observation target loss area occupancy is high. Specifically, whether or not the observation target loss area occupancy is equal to or larger than a given threshold value may be determined.

4. Third Embodiment

A method that implements the deletion determination process using a lesion area as the observation target area, and using the lesion coverage and the lesion loss area occupancy (observation target coverage and observation target loss area occupancy in a broad sense) as index values, is described below. A configuration example of the image processing device according to the third embodiment is the same as that illustrated in FIG. 4 (except for the process performed by the deletion determination section 1006), and detailed description thereof is appropriately omitted. The flow of the process according to the third embodiment is the same as that illustrated in FIG. 6 (flowchart) (except for the process performed in the step S106), and detailed description thereof is appropriately omitted.

4.1 System Configuration Example and Flow of Process

Figure 15:
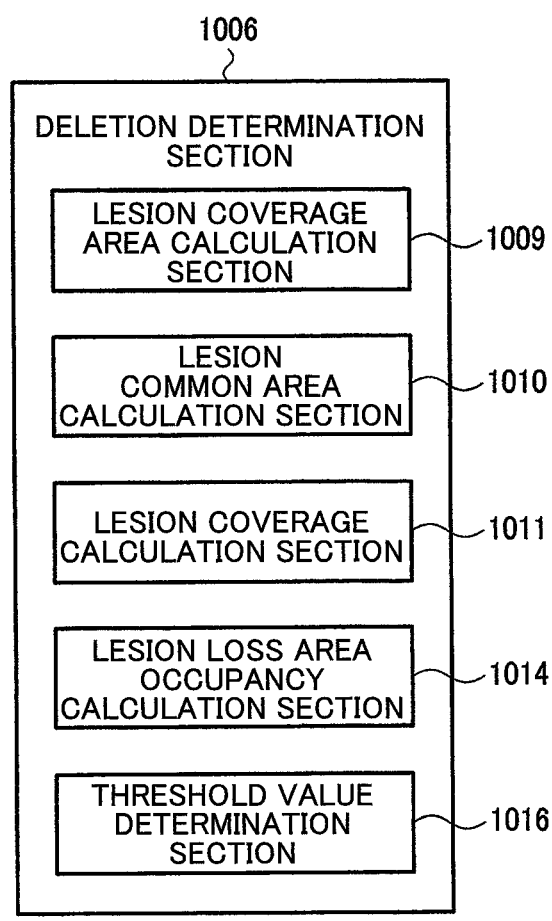
FIG. 15 illustrates a configuration example of a deletion determination section according to a third embodiment.

A configuration example of the image processing device according to the third embodiment is the same as that illustrated in FIG. 4. FIG. 15 illustrates a configuration example of the deletion determination section 1006 according to the third embodiment. As illustrated in FIG. 15, the deletion determination section 1006 may include a lesion coverage area calculation section 1009, a lesion common area calculation section 1010, a lesion coverage calculation section 1011, a lesion loss area occupancy calculation section 1014, and a threshold value determination section 1016. Note that the configuration of the deletion determination section 1006 is not limited to the configuration illustrated in FIG. 15. Various modifications may be made, such as omitting some of the elements illustrated in FIG. 15, or adding other elements.

The lesion coverage area calculation section 1009 deforms the lesion area (C1) included in the reference image, and projects the deformed lesion area onto the determination target image to calculate the lesion coverage area (C2), and the lesion common area calculation section 1010 calculates the common area of the lesion area (C3) included in the determination target image and the lesion coverage area (C2) as the lesion common area (C4) (see the first embodiment) (see FIG. 3). The lesion coverage calculation section 1011 calculates the ratio of the lesion common area (C4) with respect to the lesion area (C3) included in the determination target image as the lesion coverage, and the lesion loss area occupancy calculation section 1014 calculates the ratio of the lesion loss area (C3-C4) with respect to the determination target image as the lesion loss area occupancy.

The threshold value determination section 1016 performs a first threshold value determination process that compares a first threshold value with the lesion coverage, and a second threshold value determination process that compares a second threshold value with the lesion loss area occupancy.

The method that utilizes the lesion coverage and the method that utilizes the lesion loss area occupancy may be combined in various ways. The second embodiment that utilizes the lesion loss area occupancy deals with a problem in which the determination target image that should be deleted taking account of the size of the lesion loss area cannot be deleted by the process that utilizes the lesion coverage (see FIG. 11B). Specifically, the image summarization process may be performed using the method that utilizes the lesion coverage to output an intermediate image sequence, and the image summarization process may be performed on the intermediate image sequence using the method that utilizes the lesion loss area occupancy to generate the summary image sequence.

Figure 16:
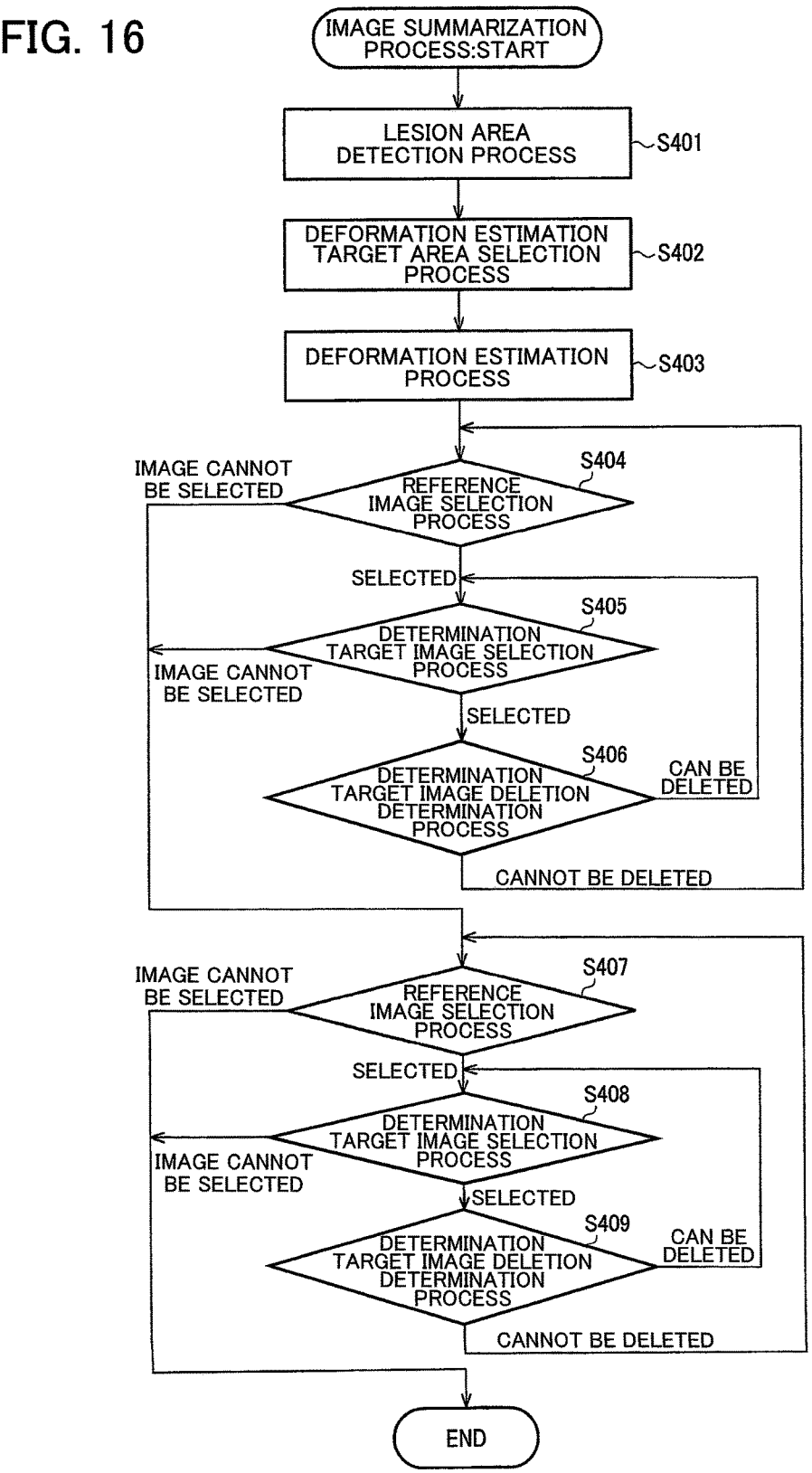
FIG. 16 is a flowchart illustrating an image summarization process according to the third embodiment.

A specific flow of the process is described below with reference to FIG. 16 (flowchart). The steps S401 to S406 in FIG. 16 are the same as the steps S101 to S106 in FIG. 6. In the step S406, the deletion determination process that utilizes the lesion coverage (see the steps S201 to S204 in FIG. 7) is performed in the same manner as in the step S106 in FIG. 6. When the reference image or the determination target image cannot be selected in the step S404 or S405, the image summarization process that utilizes the lesion coverage is terminated, and the intermediate image sequence is acquired.

The steps S407 to S409 are performed on the intermediate image sequence. In the step S409, the deletion determination process that utilizes the lesion loss area occupancy (see the steps S301 to S304 in FIG. 14) is performed. A lesion area is detected, the deformation estimation target area is selected, and the deformation information is acquired using the results obtained in the steps S402 and S403. Therefore, the image summarization process that utilizes the lesion loss area occupancy is performed on the intermediate image sequence in the steps S407 to S409.

Alternatively, both the lesion coverage and the lesion loss area occupancy may be calculated, and the first threshold value determination process that utilizes the lesion coverage, and the second threshold value determination process that utilizes the lesion loss area occupancy may be performed during a single deletion determination process, and a determination target image that has been determined to be deletable by at least one determination process may be deleted.

The first embodiment and the second embodiment may be combined in various other ways.

4.2 Modifications

A simple index value may be used instead of the lesion loss area occupancy. The second embodiment aims at dealing with a problem in which the determination target image that should be deleted taking account of the size of the lesion loss area cannot be deleted by the process that utilizes the lesion coverage (see FIG. 11B). Therefore, it is desirable to use the lesion loss area in order to make a strict determination.

However, it is considered that the situation illustrated in FIG. 11B normally occurs when the ratio of the lesion area included in the determination target image with respect to the determination target image is small (i.e., when the size of the lesion area included in the determination target image is small). Specifically, a lesion area occupancy that is the ratio of the lesion area included in the determination target image with respect to the determination target image (e.g., size (area) of lesion area included in determination target image/size (area) of determination target image) may be used as the index value instead of the lesion loss area occupancy.

In this case, however, it is impossible to implement the image summarization process that utilizes the deformation information, and a problem occurs in the same manner as in the case of using a method that performs the image summarization process without taking account of the relationship between the objects in different images. Therefore, it is not appropriate to use the lesion area occupancy as a modification of the second embodiment, and it is necessary to use the lesion area occupancy in combination with the lesion coverage described above in connection with the first embodiment. Specifically, the lesion area occupancy is used instead of the lesion loss area occupancy described above in connection with the third embodiment. In this case, since the deformation information is not required for the process that utilizes the lesion area occupancy, it is possible to reduce the processing load as compared with the basic method according to the third embodiment, for example.

More specifically, the deletion determination process is performed based on the lesion coverage, and it is determined that the determination target image can be deleted, even when it has been determined that the determination target image cannot be deleted, on condition that the lesion area occupancy of the determination target image is less than a given threshold value (see FIG. 11B).

Since it is undesirable to use the lesion area occupancy alone, it is desirable to mainly perform the deletion determination process based on the lesion coverage, and use the deletion determination process based on the lesion area occupancy as an auxiliary means.

According to the third embodiment, the processing section 100 calculates the observation target common area that is a common area of the observation target coverage area and the observation target area included in the determination target image, and calculates the observation target coverage that is the ratio of the calculated observation target common area with respect to the observation target area included in the determination target image. The processing section 100 calculates the observation target loss area occupancy that is the ratio of the observation target loss area with respect to the determination target image, the observation target loss area being an area that is included in the observation target area included in the determination target image, but is not included in the observation target common area. The processing section 100 determines whether or not the determination target image can be deleted based on the calculated observation target coverage and the calculated observation target loss area occupancy.

More specifically, the processing section 100 may determine that the determination target image can be deleted when it has been determined that the determination target image can be deleted by at least one of the determination based on the observation target coverage and the determination based on the observation target loss area occupancy.

This makes it possible to perform the deletion determination process using both the observation target coverage and the observation target loss area occupancy in combination. The observation target coverage and the observation target loss area occupancy may be combined in various ways. For example, when it is determined that the determination target image can be deleted when it has been determined that the determination target image can be deleted by at least one of the determination based on the observation target coverage and the determination based on the observation target loss area occupancy, the effect of reducing the number of images can be improved, and the burden imposed on the user can be reduced as compared with the case of using the observation target coverage or the observation target loss area occupancy alone.

The processing section 100 may calculate the observation target common area that is a common area of the observation target coverage area and the observation target area included in the determination target image, and calculate the observation target coverage that is the ratio of the calculated observation target common area with respect to the observation target area included in the determination target image. The processing section 100 may calculate the observation target area occupancy that is the ratio of the observation target area included in the determination target image with respect to the determination target image. The processing section 100 may determine whether or not the determination target image can be deleted based on the calculated observation target coverage and the calculated observation target area occupancy.

More specifically, the processing section 100 may determine that the determination target image can be deleted even when it has been determined that the determination target image cannot be deleted based on the observation target coverage, on condition that the observation target area occupancy is less than a given threshold value.

This makes it possible to simply implement the method according to the third embodiment. The size of the observation target area that cannot be observed due to deletion of the determination target image can be accurately calculated by calculating the observation target loss area occupancy. However, since it is considered that the determination target image that should be deleted cannot be deleted when the ratio of the observation target area included in the determination target image with respect to the determination target image is small (see FIG. 11B), the same effect can be achieved by utilizing the observation target area occupancy that can be easily calculated. However, since the deformation information is not used to calculate the observation target area occupancy, the advantage achieved by the deformation information (i.e., it is possible to control the degree by which the observation target area cannot be observed) is lost when the observation target area occupancy is used alone. Therefore, it is desirable to determine whether or not the determination target image can be deleted using the observation target coverage based on the deformation information, and then use the observation target area occupancy as an auxiliary means.

5. Fourth Embodiment

An example in which an area other than a cover area, or an area other than an area that is not suitable for observation, is detected as the observation target area, is described below. The term "cover area" refers to a bubble area and a residue area, and the term "area that is not suitable for observation" refers to a dark area and a halation area. Note that the process after the observation target area has been detected may be implemented by applying any of the first to third embodiments. In this case, the process is performed in the same manner as described above, and detailed description thereof is omitted. The observation target loss area may be calculated in the same manner as in the second embodiment, and a erosion process that utilizes a structural element may be performed on the observation target loss area to determine whether or not the determination target image can be deleted. The details of the process that utilizes a structural element are described later.

5.1 Detection of Observation Target Area

Figure 22:
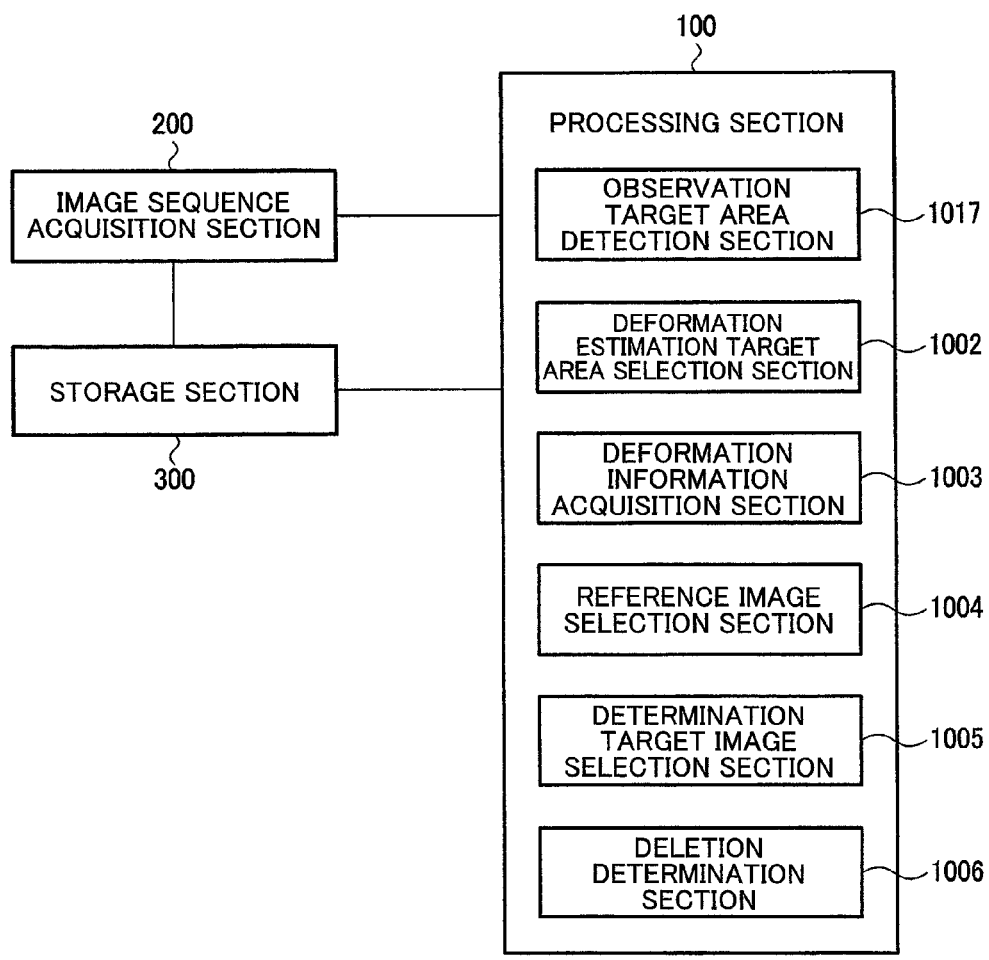
FIG. 22 illustrates another configuration example of an image processing device.

FIG. 22 illustrates a configuration example of the image processing device according to the fourth embodiment. A processing section 100 included in the image processing device includes an observation target area detection section 1017, a deformation estimation target area selection section 1002, a deformation information acquisition section 1003, a reference image selection section 1004, a determination target image selection section 1005, and a deletion determination section 1006. Note that the deletion determination section 1006 and the like have a configuration in which the block relating to a lesion area (see FIG. 5, for example) is extended to the observation target area.

The observation target area detection section 1017 detects the observation target area. A cover area or an area that is not suitable for observation can be detected from an image using various known methods (see JP-A-2007-313119, JP-A-2010-115413, JP-A-2012-16454, JP-A-2011-234931). In this case, the degree of importance of the detected area is relatively low, differing from the lesion area described above in connection with the first to third embodiments. Specifically, the observation target area detection section 1017 according to the fourth embodiment detects a cover area or an area that is not suitable for observation, and detects an area of the acquired image other than the detected cover area or the detected area that is not suitable for observation, as the observation target area.

Figure 19:
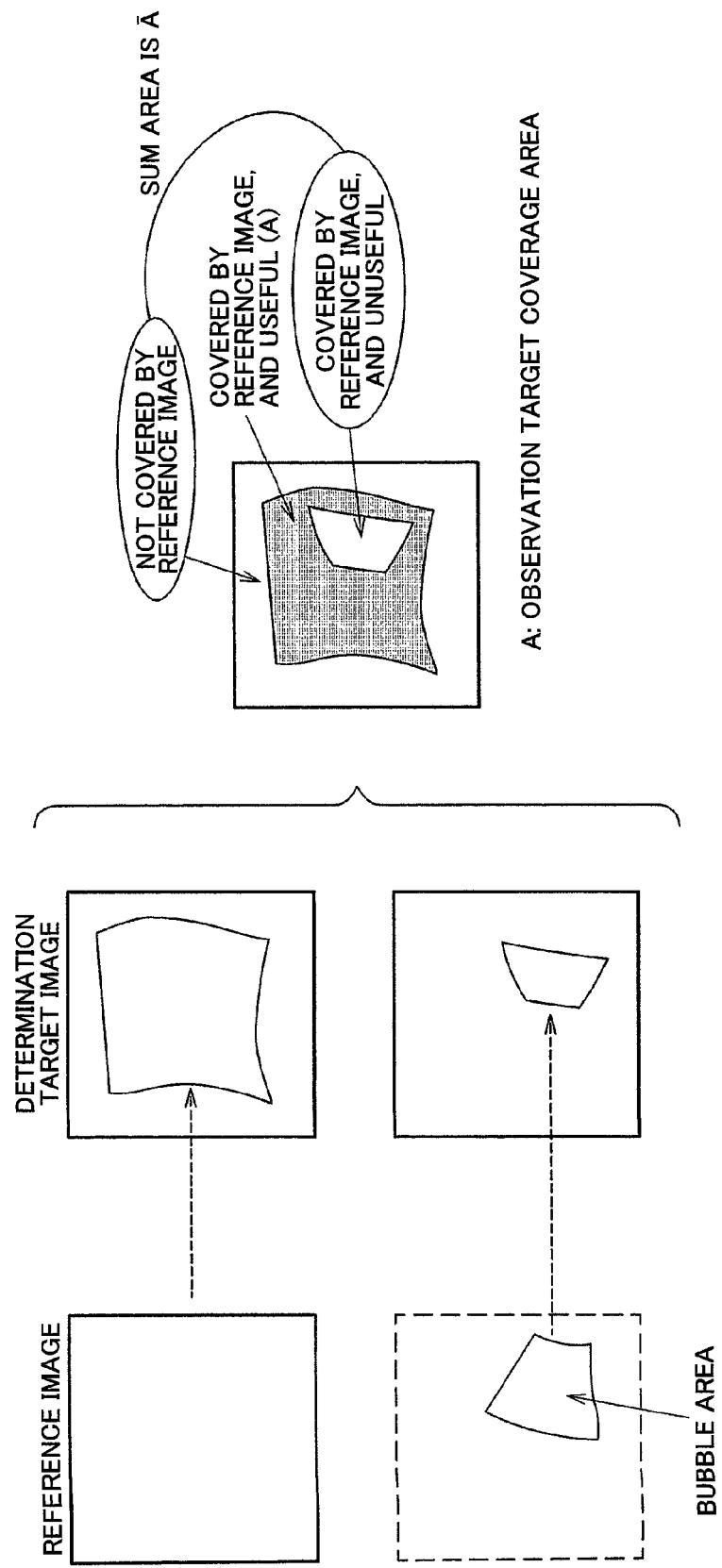

FIG. 19 illustrates a specific example of the above process. In FIG. 19, a bubble area has been detected from the reference image, and the entire reference image and the bubble area have been deformed using the deformation information, and projected onto the determination target image. In this case, the bubble area included in the reference image corresponds to the cover area, and an area of the reference image other than the bubble area corresponds to the observation target area.

An area of the determination target image other than the area in which the entire reference image is projected, is not covered by the reference image. An area of the determination target image in which the bubble area is projected is covered by the reference image, but bubbles are captured, and cover the mucous membrane and the like in an area of the reference image corresponding to the area in which the bubble area is projected. Specifically, the area in which the bubble area is projected is not a useful area. Therefore, an area of the determination target image that is covered by the reference image and is useful (i.e., observation target coverage area) is the hatched area A illustrated in FIG. 19.

Figure 20:
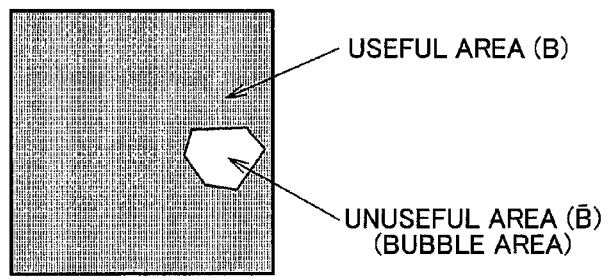

The observation target area is also detected from the determination target image. For example, when a bubble area has been detected as illustrated in FIG. 20, the area B that is an area of the determination target image other than the bubble area is detected as the observation target area.

Figure 21A:
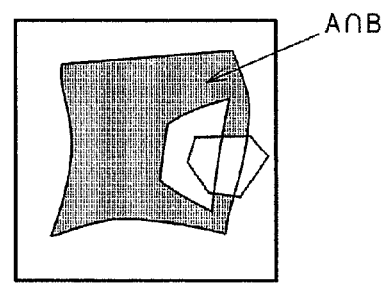
FIG. 21A illustrates an example of an observation target common area.
Figure 21B:
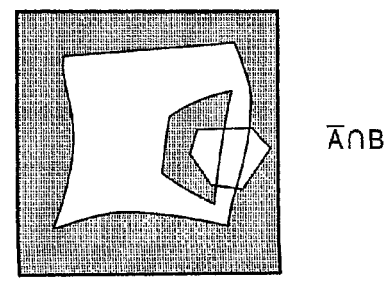
FIG. 21B illustrates an example of an observation target loss area.

The process after the information about the observation target coverage area and the observation target area included in the determination target image has been acquired is performed in the same manner as in the first to third embodiments. Specifically, the process may be performed using a common area of the observation target coverage area A and the observation target area B included in the determination target image as the observation target common area (see FIG. 21A) in the same manner as in the first embodiment. Alternatively, the process may be performed using an area of the observation target area B included in the determination target image other than the observation target coverage area (i.e., an area other than the area A) as the observation target loss area (see FIG. 21B) in the same manner as in the second embodiment. Alternatively, the process may be performed using both the observation target common area and the observation target loss area in the same manner as in the third embodiment. These processes are performed in the same manner as described above, and detailed description thereof is omitted.

5.2 Erosion Process that Utilizes Structural Element

In the fourth embodiment, whether or not the determination target image can be deleted may be determined from the viewpoint of the probability that the attention area having a given size is missed due to deletion of an image. In this case, whether or not the entirety of the attention area having a given size is included within an area that cannot be observed due to deletion of the determination target image may be determined. A case where the entirety of the attention area is included within an area that cannot be observed due to deletion of the determination target image corresponds to a case where the information about the attention area is lost due to deletion of the determination target image when the attention area is present in an area of the determination target image that cannot be observed due to deletion of the determination target image. In this case, the attention area may be missed. When the entirety of the attention area is not included within an area that cannot be observed due to deletion of the determination target image, an area of the attention area situated outside the above area can be covered by the reference image. Therefore, it is possible to observe at least part of the attention area by allowing the reference image to remain.

Figure 23:
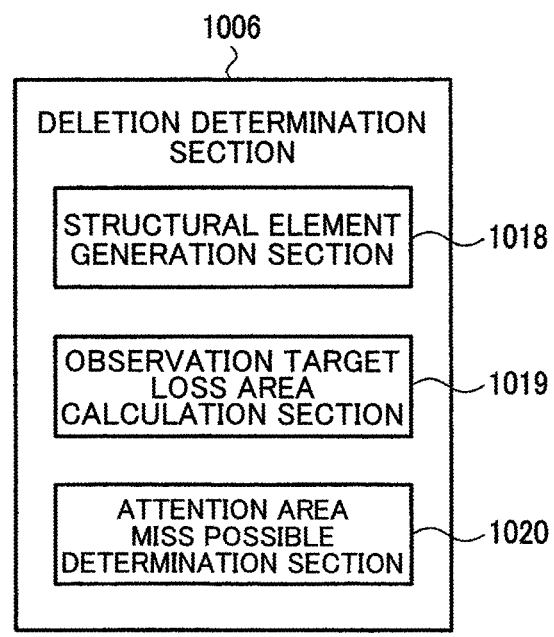
FIG. 23 illustrates a configuration example of a deletion determination section according to a fourth embodiment.

The erosion process that utilizes a structural element that corresponds to the attention area may be performed to implement the above determination process. An example of the process that utilizes the structural element that corresponds to the attention area is described below. As illustrated in FIG. 323, the deletion determination section 1006 may include a structural element generation section 1018, an observation target loss area calculation section 1019, and an attention area miss probability determination section 1020. Note that the configuration of the deletion determination section 1006 is not limited to the configuration illustrated in FIG. 23. Various modifications may be made, such as omitting some of the elements illustrated in FIG. 23, or adding other elements.

The structural element generation section 1018 generates the structural element that is used for the process performed by the attention area miss probability determination section 1020 based on the attention area. For example, an area having the same shape and the same size as those of the attention area is set to be the structural element. Note that the structural element is not limited thereto.

The observation target loss area calculation section 1019 calculates an area that cannot be observed due to deletion of the determination target image. This process is the same as the process that calculates the observation target loss area (see FIG. 21B).

The attention area miss probability determination section 1020 performs a determination process that determines the probability that the attention area captured within the determination target image is not observed (captured) within the reference image (i.e., the attention area is missed) when the determination target image is deleted.

A specific flow of the process is described below. The structural element generation section 1018 generates the structural element based on the attention area. The structural element generation section 1018 sets an area having a size and a shape that should not be missed to be the structural element taking account of a typical size and the like of the attention area. For example, when the attention area is a lesion, and a lesion that is larger than a circle having a diameter of 30 pixels within the image is severe, and should not be missed, a circle having a diameter of 30 pixels is set to be the structural element.

When the reference image and the determination target image have been selected, the observation target loss area calculation section 1019 calculates the observation target loss area as described above with reference to FIG. 21B.

The attention area miss probability determination section 1020 determines the probability that the attention area is missed. Specifically, the attention area miss probability determination section 1020 performs the erosion process that utilizes the structural element on the observation target loss area to determine whether or not a residual area is present (as described below with reference to FIG. 24D).

A specific example of the erosion process is described below with reference to FIGS. 24A to 24E. As illustrated in FIG. 24A, the observation target loss area is necessarily a closed area, and the boundary of the observation target loss area can be set. For example, an outer boundary BO1 and an inner boundary BO2 are set in FIG. 24A. Note that the observation target loss area may be formed by a plurality of discontinuous areas (see FIG. 21B). In such a case, the erosion process may be performed on each area. FIGS. 24A to 24E illustrate an example in which a single continuous area is used as the observation target loss area.

The erosion process that utilizes the structural element removes the overlapping area of the observation target loss area and the structural element when a reference point of the structural element is set at the boundary of the observation target loss area. For example, when a circular area is set to be the structural element, and the reference point of the structural element is the center of the circle, the erosion process draws a circle so that the center of the circle is situated at the boundary of the observation target loss area, and excludes the overlapping area of the circle and the observation target loss area from the observation target loss area. Specifically, a circle is drawn around a point situated at the outer boundary BO1 of the observation target loss area (see FIG. 24A), and the overlapping area of the circle and the observation target loss area (i.e., the semicircular area indicated by the diagonal lines in FIG. 24A) is excluded from the observation target loss area.

Since the outer boundary BO1 is processed discretely, and includes a plurality of points, the above process may be performed on each point among the plurality of points. For example, a circle may be sequentially drawn around points situated at the outer boundary BO1 in a given direction (see FIG. 24A), and the overlapping area of each circle and the observation target loss area may be excluded from the observation target loss area.

When part of the boundary of the observation target loss area coincides with the boundary of the determination target image, for example, the observation target loss area may have only a single boundary. In such a case, the above process may be performed on the single boundary. When the observation target loss area has the outer boundary BO1 and the inner boundary BO2 (see FIG. 24A), the above process is performed on the outer boundary BO1 and the inner boundary BO2. Specifically, a circle is drawn around a point situated at the inner boundary BO2 (see FIG. 24B), and the overlapping area of each circle and the observation target loss area is excluded from the observation target loss area. This process is repeatedly performed on each point situated at the inner boundary BO2.

The size (area) of the observation target loss area is reduced by thus performing the erosion process. For example, the left part of the observation target loss area illustrated in FIG. 24A is completely deleted (i.e., no residual area is present) by the erosion process performed on the outer boundary BO1 (see FIG. 24A) and the erosion process performed on the inner boundary BO2 (see FIG. 24B). On the other hand, a residual area RE that is not deleted by the erosion process performed on the outer boundary BO1 and the erosion process performed on the inner boundary BO2 occurs in the lower right part of the observation target loss area (see FIG. 24C). Specifically, only the residual area RE remains as a result of performing the erosion process that utilizes the structural element over the entire observation target loss area (see FIG. 24D).

The meaning of the erosion process when using a circle having a radius r as the structural element is discussed below. The observation target loss area (i.e., closed area) is considered to be an area that is surrounded by a boundary (different boundaries (e.g., BO1 and BO2) or a single boundary). When the erosion process is performed on the boundary, a point among the points included in the observation target loss area that is situated at a distance equal to or shorter than r from each point situated at the boundary is determined to be the deletion target. Specifically, the distance from the point included in the residual area (that is excluded from the deletion target) to an arbitrary point situated at the boundary is longer than r. Therefore, a circle having a radius r that is drawn around an arbitrary point within the residual area does not intersect each boundary. This means that the entirety of the attention area represented by a circle having a radius r that is drawn around a point within the residual area is included within the observation target loss area. Note that the above basic idea is also applied even when the structural element has a shape (e.g., quadrangle) other than a circle.

Figure 24C:
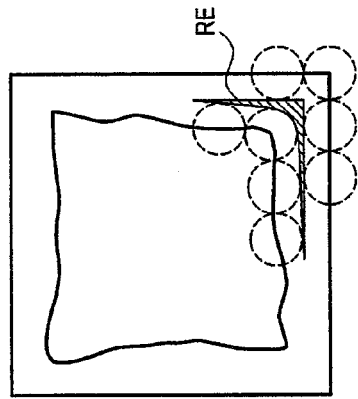
FIGS. 24A to 24E are views illustrating a erosion process that utilizes a structural element performed on an observation target loss area.
Figure 24B:
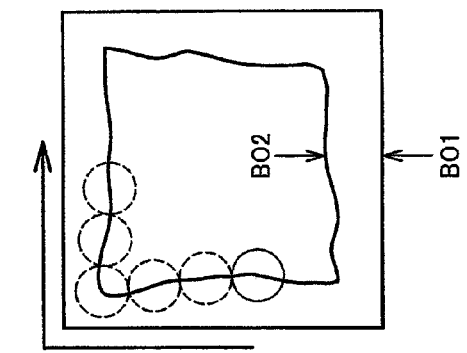
Figure 24E:
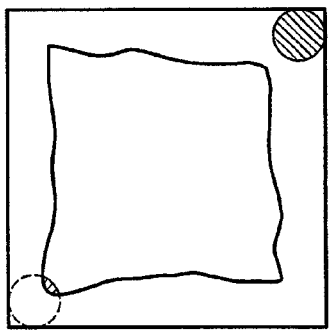
Figure 24A:
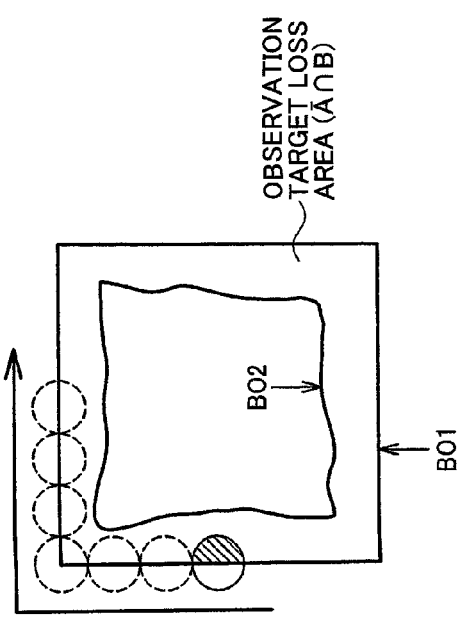
Figure 24D:
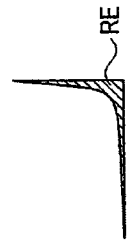

Specifically, when the residual area is present, an area that corresponds to the structural element is included within the observation target loss area (see the lower right part in FIG. 24E). When the attention area (e.g., lesion) is situated at such a position, and the determination target image is deleted, it is likely that the attention area cannot be observed even if the reference image is allowed to remain. When the residual area is not present, at least part of the attention area is included within an area that is not lost (see the upper left part in FIG. 24E). In this case, at least part of the attention area remains in the reference image even if the determination target image is deleted. Note that the term "area that is not lost" corresponds to an area included in the observation target coverage area that is covered by the reference image and is useful, or an area that need not be covered by the reference image since the area is not included in the observation target area included in the determination target image.

Therefore, the attention area miss probability determination section 1020 performs the erosion process that utilizes the structural element on the observation target loss area, and determines whether or not the determination target image can be deleted based on whether or not the residual area is present.

Figure 25A:
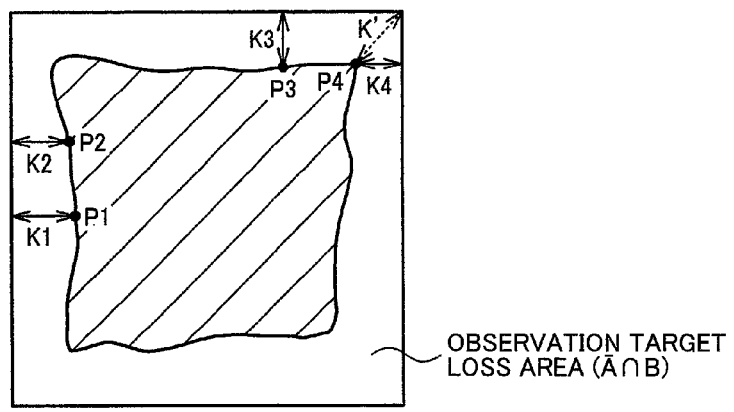
FIGS. 25A and 25B are views illustrating another process that utilizes a structural element.
Figure 25B:
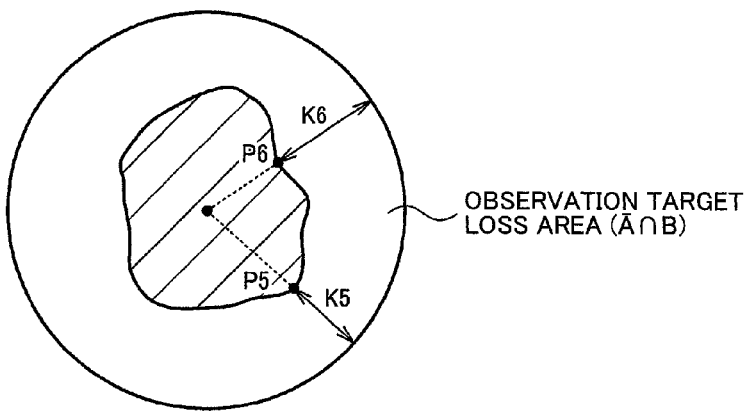

The deletion determination process that utilizes the structural element is not limited to the deletion determination process that utilizes the erosion process. It suffices that the deletion determination process that utilizes the structural element determines whether or not the structural element is included within the observation target loss area. For example, the deletion determination process that utilizes the structural element may be implemented using a simple method that calculates a value that corresponds to the maximum size (diameter) of the observation target loss area based on the distance (e.g., k1 to k6) from the point (e.g., p1 to p6) at the boundary of an area other than the observation target loss area to the boundary of the determination target image, or the distance from the point at the boundary of the determination target image to the boundary of an area other than the observation target loss area, and compares the calculated value with the minimum size of the structural element (e.g., a structural element having the same size as that of the attention area) (see FIGS. 25A and 25B). Note that FIG. 25A illustrates an example in which the determination target image has a square shape, and FIG. 25B illustrates an example in which the determination target image has a circular shape. The process that utilizes the structural element may also be performed on the observation target loss area (lesion loss area) described above in connection with the first to third embodiments.

According to the fourth embodiment, the processing section 100 determines the probability that the attention area included in the determination target image is missed using the observation target loss area that is an area that is included in the observation target area included in the determination target image, but is not included in the observation target coverage area, and determines whether or not the determination target image can be deleted based on the probability that the attention area is missed.

The term "attention area" used herein refers to an area for which the observation priority for the user is relatively higher than that of other areas. For example, when the user is a doctor, and desires to perform treatment, the attention area refers to an area in which a mucous membrane area or a lesion area is captured.

If the doctor desires to observe bubbles or feces, the term "attention area" refers to an area that includes a bubble area or a feces area. In this case, bubbles or a residue is a useful object for observation, and a bubble area or a residue area is not considered to be an unnecessary area. Specifically, the attention area for the user differs depending on the objective of observation, but is necessarily an area for which the observation priority for the user is relatively higher than that of other areas.

This makes it possible to determine whether or not the determination target image can be deleted from the viewpoint of the probability that the attention area is missed. It is determined that the determination target image cannot be deleted when the attention area is not missed unless the determination target image is deleted, but is missed due to deletion of the determination target image even if the reference image is allowed to remain. The probability that the attention area is missed may be determined using various methods. For example, it may be determined that the attention area may be missed when the attention area is captured within the determination target image to have a large size, but may be captured within the reference image to have a small size (or may not be captured within the reference image).

The processing section 100 may determine the probability that the attention area is missed by determining whether or not an area having a size corresponding to the attention area is included within the observation target loss area.

This makes it possible to determine the probability that the attention area is missed based on the inclusion relationship between the observation target loss area and an area having a size corresponding to the attention area, and determine whether or not the determination target image can be deleted. A case where an area having a size corresponding to the attention area is included within the observation target loss area corresponds to a case where the attention area having a given size is captured within the determination target image, but may not be captured within the reference image. In this case, it is determined that the determination target image cannot be deleted since the attention area may be missed. On the other hand, when an area having a size corresponding to the attention area is not included within the observation target loss area, at least part of the attention area captured within the determination target image is necessarily captured within the reference image. Therefore, it is determined that the determination target image can be deleted.

The processing section 100 may perform the erosion process that utilizes the structural element that corresponds to the attention area on the observation target loss area, determine that the determination target image cannot be deleted when it has been determined by the erosion process that the residual area is present, and the attention area may be missed, and determine that the determination target image can be deleted when it has been determined by the erosion process that the residual area is not present, and the attention area is not missed.

The term "structural element" used herein refers to an element that represents the processing unit used for the erosion process. For example, the structural element is the circular element illustrated in FIG. 24A and the like. The term "erosion process" used herein refers to a process that deletes an area corresponding to the structural element from the processing target area (see FIGS. 24A to 24E).

This makes it possible to accurately determine whether or not the entirety of the structural element (having the same size as that of the attention area) is included within the observation target loss area. The presence or absence of the residual area corresponds to whether or not the entirety of the structural element is included within the observation target loss area (see FIGS. 24A to 24E). Since whether or not the entirety of the structural element is included within the observation target loss area is strictly determined, the accuracy of the determination as to whether or not the determination target image can be deleted can be increased as compared with the method described above with reference to FIGS. 25A and 25B, for example. Note that the method described above with reference to FIGS. 25A and 25B may be used when it is important to reduce the processing load, for example.

The processing section 100 may detect an area of the image other than the cover area as the observation target area.

More specifically, the image sequence may be an in vivo image sequence obtained by capturing the inside of a living body, and the cover area may be a bubble area or a residue area included in the image.

This makes it possible to use an area other than the cover area as the observation target area. The term "cover area" used herein refers to an area in which bubbles or a residue is captured to cover the observation target object (e.g., mucous membrane). An area other than the cover area is an area which is not necessarily an area that should be observed (e.g., lesion area or villus area (see the first to third embodiments)), but in which at least a covering object is not captured. Specifically, since the observation priority of an area other than the cover area is relatively high, it is useful to implement the image summarization process that suppresses a situation in which an area other than the cover area cannot be observed.

The processing section 100 may detect an area of the image other than an area for which the image signal is not suitable for observation, as the observation target area.

An area for which the image signal is not suitable for observation may be a dark area or a halation area included in the image.

This makes it possible to use an area other than an area that is not suitable for observation as the observation target area. An area that is not suitable for observation is an area (e.g., dark area or halation area) in which blocked up shadows or blown out highlights occur since the pixel values are very large or small, and the observation target object cannot be sufficiently observed. Since the observation priority of an area other than an area that is not suitable for observation is relatively high, it is desirable to use an area other than an area that is not suitable for observation as the observation target area.

The first to fourth embodiments according to the invention and the modifications thereof have been described above. Note that the invention is not limited to the first to fourth embodiments and the modifications thereof. Various modifications and variations may be made of the first to fourth embodiments and the modifications thereof without departing from the scope of the invention. A plurality of elements described above in connection with the first to fourth embodiments and the modifications thereof may be appropriately combined to implement various configurations. For example, an arbitrary element may be omitted from the elements described above in connection with the first to fourth embodiments and the modifications thereof. The elements described above in connection with the first to fourth embodiments and the modifications thereof may be appropriately combined. Any term cited with a different term having a broader meaning or the same meaning at least once in the specification and the drawings can be replaced by the different term in any place in the specification and the drawings. Specifically, various modifications and applications are possible without materially departing from the novel teachings and advantages of the invention.

The invention claimed is:

1. An image processing device which processes an image sequence that includes a plurality of constituent images, the image processing device comprising:
   a processor and a memory storing a program that is executable by the processor to perform an image summarization process that deletes some of the plurality of constituent images included in the image sequence to generate a summary image sequence, the image summarization process including:

detecting an observation target area from each constituent image among the plurality of constituent images;
selecting a reference image and a determination target image from the plurality of constituent images;
calculating deformation information about a deformation estimation target area included in the reference image and the deformation estimation target area included in the determination target image;
calculating an observation target coverage area by performing a deformation process using the deformation information on the observation target area included in the reference image, the observation target coverage area being an area that is included in the determination target image, and is covered by the observation target area included in the reference image;
calculating an observation target common area that is a common area of the observation target coverage area and the observation target area included in the determination target image;
calculating an observation target coverage that is a ratio of the calculated observation target common area with respect to the observation target area included in the determination target image; and
determining whether or not the determination target image can be deleted based on the calculated observation target coverage.

2. The image processing device as defined in claim 1, wherein the processor determines that the determination target image can be deleted when the observation target coverage is equal to or larger than a given threshold value, and determines that the determination target image cannot be deleted when the observation target coverage is smaller than the given threshold value.

3. An image processing device which processes an image sequence that includes a plurality of constituent images, the image processing device comprising:
a processor and a memory storing a program that is executable by the processor to perform an image summarization process that deletes some of the plurality of constituent images included in the image sequence to generate a summary image sequence, the image summarization process including:
detecting an observation target area from each constituent image among the plurality of constituent images;
selecting a reference image and a determination target image from the plurality of constituent images;
calculating deformation information about a deformation estimation target area included in the reference image and the deformation estimation target area included in the determination target image;
calculating an observation target coverage area by performing a deformation process using the deformation information on the observation target area included in the reference image, the observation target coverage area being an area that is included in the determination target image, and is covered by the observation target area included in the reference image;
calculating an observation target loss area occupancy that is a ratio of an observation target loss area with respect to the determination target image, the observation target loss area being an area that is included in the observation target area included in the determination target image, but is not included in the observation target coverage area; and
determining whether or not the determination target image can be deleted based on the calculated observation target loss area occupancy.

4. The image processing device as defined in claim 3, wherein the processor determines that the determination target image can be deleted when the observation target loss area occupancy is smaller than a given threshold value, and determines that the determination target image cannot be deleted when the observation target loss area occupancy is equal to or larger than the given threshold value.

5. An image processing device which processes an image sequence that includes a plurality of constituent images, the image processing device comprising:
a processor and a memory storing a program that is executable by the processor to perform an image summarization process that deletes some of the plurality of constituent images included in the image sequence to generate a summary image sequence, the image summarization process including:
detecting an observation target area from each constituent image among the plurality of constituent images;
selecting a reference image and a determination target image from the plurality of constituent images;
calculating deformation information about a deformation estimation target area included in the reference image and the deformation estimation target area included in the determination target image;
calculating an observation target coverage area by performing a deformation process using the deformation information on the observation target area included in the reference image, the observation target coverage area being an area that is included in the determination target image, and is covered by the observation target area included in the reference image;
determining a probability that an attention area included in the determination target image is missed using an observation target loss area that is an area that is included in the observation target area included in the determination target image, but is not included in the observation target coverage area; and
determining whether or not the determination target image can be deleted based on the probability that the attention area is missed.

6. The image processing device as defined in claim 5, wherein the processor determines the probability that the attention area included in the determination target image is missed by determining whether or not an area having a size corresponding to the attention area is included within the observation target loss area.

7. The image processing device as defined in claim 5, wherein the processor performs an erosion process that utilizes a structural element that corresponds to the attention area on the observation target loss area, determines that the determination target image cannot be deleted when it has been determined by the erosion process that a residual area is present, and the attention area may be missed, and determines that the determination target image can be deleted when it has been determined by the erosion process that the residual area is not present, and the attention area is not missed.

8. The image processing device as defined in claim 1, wherein the image summarization process further includes:
calculating an observation target loss area occupancy that is a ratio of an observation target loss area with respect to the determination target image, the observation target loss area being an area that is included in the observation target area included in the determination target image, but is not included in the observation target common area; and determining whether or not the determination target image can be deleted based on the calculated observation target coverage and the calculated observation target loss area occupancy.

9. The image processing device as defined in claim 8, wherein the processor determines that the determination target image can be deleted when it has been determined that the determination target image can be deleted by at least one of a determination based on the observation target coverage and a determination based on the observation target loss area occupancy.

10. The image processing device as defined in claim 1, wherein the processor detects an area of the image other than a cover area as the observation target area.

11. The image processing device as defined in claim 10, wherein:
the image sequence is an in vivo image sequence obtained by capturing images inside of a living body, and
the cover area is a bubble area or a residue area included in the image.

12. The image processing device as defined in claim 1, wherein the processor detects an area of the image other than an area for which an image signal is not suitable for observation, as the observation target area.

13. The image processing device as defined in claim 12, wherein the area for which the image signal is not suitable for observation is a dark area or a halation area included in the image.

14. The image processing device as defined in claim 1, wherein:
the image sequence is an in vivo image sequence obtained by capturing images inside of a living body, and
the processor detects a lesion area or a villus area included in the image as the observation target area.

15. An image processing method comprising:
acquiring an image sequence that includes a plurality of constituent images; and
performing an image summarization process that deletes some of the plurality of constituent images included in the image sequence to generate a summary image sequence, the image summarization process comprising:
detecting an observation target area from each constituent image among the plurality of constituent images;
selecting a reference image and a determination target image from the plurality of constituent images;
calculating deformation information about a deformation estimation target area included in the reference image and the deformation estimation target area included in the determination target image;
calculating an observation target coverage area by performing a deformation process using the deformation information on the observation target area included in the reference image, the observation target coverage area being an area that is included in the determination target image, and is covered by the observation target area included in the reference image;
calculating an observation target common area that is a common area of the observation target coverage area and the observation target area included in the determination target image;
calculating an observation target coverage that is a ratio of the calculated observation target common area with respect to the observation target area included in the determination target image; and
determining whether or not the determination target image can be deleted based on the calculated observation target coverage.

* * * * *